(12) United States Patent
Huang et al.

(10) Patent No.: US 11,036,724 B2
(45) Date of Patent: Jun. 15, 2021

(54) INTERACTIVE VISUAL SEARCH ENGINE

(71) Applicant: Microsoft Technology Licensing, LLC, Redmond, WA (US)

(72) Inventors: Li Huang, Sammamish, WA (US); Houdong Hu, Redmond, WA (US); Meenaz Merchant, Kirkland, WA (US); Arun Sacheti, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/560,942

(22) Filed: Sep. 4, 2019

(65) Prior Publication Data
US 2021/0064612 A1 Mar. 4, 2021

(51) Int. Cl.
*G06F 16/242* (2019.01)
*G06F 16/9038* (2019.01)
*G06F 3/0482* (2013.01)
*G06F 16/28* (2019.01)
*G06F 16/951* (2019.01)
*G06F 16/9535* (2019.01)
*G06F 3/0481* (2013.01)

(52) U.S. Cl.
CPC ........ *G06F 16/2428* (2019.01); *G06F 3/0482* (2013.01); *G06F 3/04815* (2013.01); *G06F 16/289* (2019.01); *G06F 16/9038* (2019.01); *G06F 16/951* (2019.01); *G06F 16/9535* (2019.01)

(58) Field of Classification Search
CPC ............... G06F 16/2428; G06F 16/289; G06F 16/9038; G06F 3/0482
See application file for complete search history.

(56) References Cited

U.S. PATENT DOCUMENTS

| | | |
|---|---|---|
| 10,068,284 B1* | 9/2018 | Zisk ................... G06F 3/0482 |
| 2014/0267770 A1 | 9/2014 | Gervautz et al. |
| 2015/0088923 A1 | 3/2015 | Garcia-Barrio et al. |
| 2016/0378861 A1 | 12/2016 | Eledath et al. |
| 2017/0206279 A1* | 7/2017 | Eleish .................. G06F 16/58 |
| 2017/0206797 A1* | 7/2017 | Solomon ............... G06N 3/006 |
| 2018/0068031 A1 | 3/2018 | Hewavitharana et al. |
| 2018/0276495 A1 | 9/2018 | Yu et al. |
| 2018/0293256 A1* | 10/2018 | Westphal ............. G06F 16/532 |
| 2018/0336414 A1 | 11/2018 | Badr et al. |
| 2018/0336415 A1* | 11/2018 | Anorga .............. G06K 9/00671 |
| 2019/0318405 A1* | 10/2019 | Hu ........................ G06K 9/66 |
| 2019/0391715 A1* | 12/2019 | Joyce .................... G06T 11/60 |

OTHER PUBLICATIONS

"International Search Report and Written Opinion Issued in PCT Application No. PCT/US2020/038005", dated Jul. 30, 2020, 15 Pages.

* cited by examiner

*Primary Examiner* — David E Choi
(74) *Attorney, Agent, or Firm* — Medley, Behrens & Lewis, LLC

(57) ABSTRACT

A visual search engine is described herein. The visual search engine is configured to return information to a client computing device based upon a multimodal query received from the client computing device (wherein the multimodal query comprises an image and text). The visual search engine is further configured to interact with a user of the client computing device to disambiguate information retrieval intent of the user.

20 Claims, 20 Drawing Sheets

INTERACTIVE VISUAL SEARCH ENGINE

BACKGROUND

A computer-implemented visual search engine is configured to receive, from a client computing device, a digital image as an input query and is further configured to return a search result to the client computing device based upon the input query. In an example, a conventional visual search engine may receive, from the client computing device, an image that includes a flower as an input query and the visual search engine may return an identity of the flower as a search result to the client computing device. Hence, in this example, a user may be walking in a garden and observe a flower that interests the user. The user can employ a mobile computing device (such as a smart phone) to generate an image that includes the flower and then provide the image to the visual search engine. The visual search engine receives the image, identifies the flower captured in the image, and returns a search result to the mobile computing device, wherein the search result includes information about the flower.

In another example, a conventional visual search engine may receive, from the client computing device and as an input query, an image that includes an article of clothing. The conventional visual search engine can then return a second image as a search result to the client computing device, where the second image includes a second article of clothing that is similar to the article of clothing included in the first image. Thus, the user may observe an article of clothing that the user is interested in purchasing. The user can employ the mobile computing device to generate an image that includes the article of clothing and provide the image to the visual search engine. The visual search engine receives the image, identifies a second image that includes a second article of clothing that is similar to the article of clothing captured in the image provided to the visual search engine by the client computing device, and returns the second image as a search result to the mobile computing device. In a nonlimiting example, the visual search engine may assign a hyperlink to the second image, such that when the user selects the second image a web page can be presented on the mobile computing device, wherein the user can purchase the article of clothing captured in the second image by way of the web page.

While a conventional visual search engine provides for the functionality set forth above, overall functionality of conventional visual search engines is somewhat limited. For instance, with respect to the example set forth above where the visual search engine is provided with an image that includes a flower, the conventional visual search engine may provide information about such flower that is not germane to what the user is interested in learning about the flower. For example, the user may not be interested in learning the identity of the flower; however, the user may want to know when to plant the flower and how often to water the flower. To acquire such information through use of a conventional visual search engine, the user must direct a computing device to provide an image of the flower to the visual search engine. The visual search engine, upon receiving the image, may return an identity of the flower to the computing device as a search result. For example, the identify of the flower may be "daisy". The user must then navigate to a conventional search engine and set forth a textual query, wherein the textual query includes the identity of the flower (returned by the visual search engine) as well as keywords that represent the information retrieval intent of the user (e.g., "when should a daisy be planted"). This process is somewhat cumbersome, as the user must navigate between applications and/or webpages and provide different input to the different applications and/or web pages to acquire desired information.

SUMMARY

The following is a brief summary of subject matter that is described in greater detail herein. This summary is not intended to be limiting as to the scope of the claims.

Described herein are various technologies pertaining to a visual search engine that is configured to return search results based upon a multimodal query and/or upon information acquired from a user in a multi-step interaction. A multimodal query includes two different types of input: 1) an image; and 2) text input or voice input. A multi-step interaction refers to the visual search engine receiving a query, generating a message that requests additional information based upon the query, receiving the requested information, and generating output based upon the query and the additional information. The visual search engine can request additional information to disambiguate content of the received query, to assist the user in exploring a topic, to disambiguate the information retrieval intent of the user, etc.

The visual search engine described herein includes a visual intent module, wherein the visual intent module comprises a topic identifier module and an intent chat bot that operate in conjunction to identify an intent of a user who sets forth a query to the visual search engine, wherein the query includes an image. The visual intent module is configured to receive an image that includes one or more objects. The topic identifier module is configured to identify topic(s) that correspond to object(s) captured in the image. For example, when the visual intent module receives a query that comprises an image that includes a flower, the topic identifier module is configured to ascertain that the image includes an object that corresponds to the topic "flowers". Thus, the visual intent module can ascertain that the user intends to acquire information pertaining to the topic "flowers". The query may also include text, and the intent chat hot can receive the text included in the query. For instance, the text may include keywords that represent an information retrieval intent of the user who submitted the query to the visual search engine. For example, the query may be "what time of year does this flower bloom?". The intent chat bot can identify the entity "flower" in the text. Based upon the output of the topic identifier module and further (optionally) based upon the entity in the text, the visual intent module can ascertain that the user who submitted the query is interested in the topic "flowers".

The visual search engine further includes a plurality of topic modules for a respective plurality of topics that can be identified by the visual intent module. A topic module for a topic comprises an object identifier module that is configured to identify values of attributes of objects that are assigned to the topic. The topic module for the topic further comprises a chat bot that is configured to interact with users who are attempting to acquire information pertaining to the topic by way of the visual search engine. The plurality of topic modules may correspond to topics such as, for example, "flowers", "trees", "furniture", "clothing", "buildings", "celebrities", "baked goods", etc.

Continuing with the example set forth above, the visual intent module can ascertain that the intent of the user is to acquire information pertaining to the topic "flowers", and can accordingly cause the query (which includes the image)

to be provided to a topic module that corresponds to the topic "flowers". The object identifier module is configured to identify types of flowers captured in images. In an example, the image may be somewhat blurry, and the object identifier module may be unable to determine the type of the flower with suitable confidence due to the image being blurry. The chat bot receives an indication that the object identifier module is unable to identify the type of the flower included in the image with sufficiently high confidence; in response to receiving such indication, the chat bot can generate a message that includes a request that the user capture another image of the flower of interest (which is less blurry). For example, the chat bot can generate the message "I am having trouble identifying the flower because the image is a little blurry. Could you please take another image and provide it to me?"

The visual search engine can transmit the message to the mobile computing device of the user, and the user can capture another image of the flower and upload the another image to the visual search engine per the request of the chat bot. The object identifier module receives the another image as input and, in an example, identifies that the flower is of a particular type (e.g., a tulip). The chat bot is provided with the identity of the flower and can generate a message that includes the identity of the flower. In addition, the topic module can formulate a query for provision to a general-purpose search engine based upon the determined identity of the flower (e.g., "what time of year do tulips bloom"?). The topic module provides such query to the general-purpose search engine, which generates search results based upon the query, wherein the search results include information about the identified flower. The chat bot is provided with the information, and the chat hot transmits the message that includes the identity of the flower and the information provided by the search engine to the mobile computing device of the user. It can thus be ascertained that the visual search engine can provide search results based upon a multimodal query and can further interact with a user in connection with returning information that is desired by the user.

Also described herein are graphical user interface features that facilitate exchange of messages between the mobile computing device and the visual search engine. For example, the graphical user interface may include a text entry field such that the user can submit text as well as images to the visual search engine. The graphical user interface may also include a messages field that can depict messages transmitted from chat bots of the visual search engine to the computing device operated by the user.

The visual search engine offers various advantages over conventional visual search engines. For instance, the visual search engine can provide information that corresponds to an information retrieval intent of a user due to the visual search engine being able to process multimodal queries (which can include an image and text). In another example, the visual search engine, unlike conventional visual search engines, is able to interact with users thereof to assist users with acquiring information about objects captured in images and/or performing tasks with respect to objects captured in images (such as purchasing an object).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
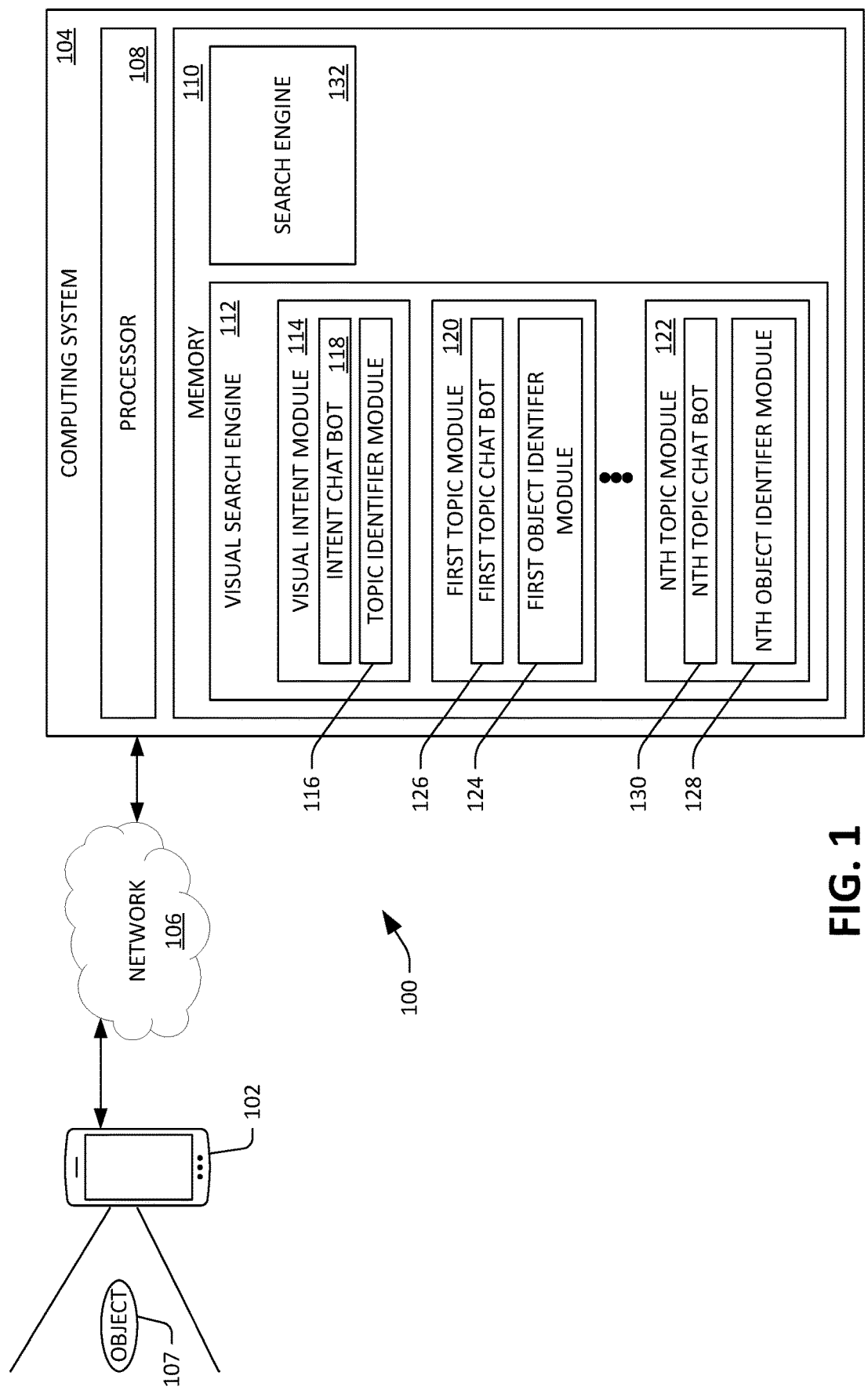
FIG. 1 is a functional block diagram of an exemplary system that facilitates returning output to a client computing device based upon a multimodal query received from the client computing device.

Various technologies pertaining to an interactive visual search engine are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein is a visual search engine that is configured to provide output to a user based upon a multimodal query set forth to the visual search engine by the user, wherein the multimodal query includes an image and text (where the text can be set forth by the user through use of a keyboard or through voice commands). In addition, the visual search engine described herein is configured to interact with end users. For example, the visual search engine is configured to prompt a user to provide information that disambiguates the information retrieval intent of the user. In addition, the visual search engine is configured to provide information to a user that assists the user with completing a task. Still further, the visual search engine is configured to provide information to a user that assists the user with exploring a topic.

With reference now to FIG. 1, an exemplary system 100 that facilitates provision of output to a client computing device operated by a user in response to the user setting forth a query that includes an image to a visual search engine by way of the client computing device is illustrated. The system 100 includes a client computing device 102 and a computing system 104, wherein the client computing device 102 and the computing system 104 are in communication with one another by way of a network 106 (e.g., the Internet). In the exemplary system 100, the client computing device 102 is illustrated as being a mobile telephone. It is to be understood, however, that the client computing device 102 may be any suitable type of computing device, including but not limited to a portable media player, a wearable computing device, a digital camera, a laptop computing device, a tablet (slate) computing device, a desktop computing device, etc. In the exemplary system 100 depicted in FIG. 1, the client computing device 102 includes a camera and is operated by a user of the client computing device 102 to capture an image of an object 107 in the environment of the client computing device 102. In another example, the client computing device 102 can acquire an image from a webpage that is available by way of the World Wide Web, can receive an image in a message transmitted to the client computing device 102 by some other computing device (e.g., as part of a Multimedia Message Service message), etc.

The computing system 104 includes a processor 108 and memory 110, wherein the memory HO includes instructions that are executed by the processor 108. The memory 110 has loaded therein a visual search engine 112 that, as will be described in greater detail below, is configured to receive a query from the client computing device 102 and generate output based upon the query. The query includes the image captured by the client computing device 102 and can optionally include text set forth by a user of the client computing device 102 (e.g., through a keyboard or voice command). Hence, the query received from the client computing device 102 by the visual search engine 112 can be multimodal, in that the query includes two different types of input (an image and text). In addition, and in contrast to conventional visual search engines, the visual search engine 112 is configured to interact with the user of the client computing device 102 to assist the user of the client computing device 102 in acquiring information that corresponds to an information retrieval intent of such user.

The visual search engine 112 includes a visual intent module 114 that is configured to identify a topic in which the user is interested, wherein the visual intent module 114 identifies the topic based upon the received query. A designer of the visual search engine 112 can define topics as well as objects that belong to topics. Exemplary topics can include "flowers", "clothing", "dogs", "automobiles", "buildings", "celebrities", amongst others. The visual intent module 114 comprises a topic identifier module 116 that is configured to identify a topic that is of interest to the user of the client computing device 102 based upon the image in the query. For example, when the image received from the client computing device 102 includes a flower and a dog, the topic identifier module 116 can output indications that the user may be interested in the topics "flowers" and "dogs" based upon content of the image.

The visual intent module 114 can further comprise an intent chat hot 118 that is configured to receive the text portion of the query and identify entities included in the text portion of the query. In addition, the intent chat bot 118 can have access to output of the topic identifier module 116. For example, the text portion of the received query may be "what type of flower is this"? The intent chat bot 118 can identify the entity "flower" in the text portion of the query and can compare the entity with the output of the topic identifier module 116 and determine that the entity "flower" and the topic "flowers" correspond to one another. Based upon the entity and the topic "flowers" corresponding to one another, the intent chat bot 118 can generate an output that indicates that the user is interested in the topic "flowers".

In another example, the visual intent module 114 may receive a query from the client computing device 102 that includes an image but fails to include a text portion. Further, as in the example set forth above, the image may include both a flower and a dog. The topic identifier module 116 can receive the image and output an indication that, based upon the image, the user is interested in the topic "dogs" and/or the topic "flowers". The intent chat bot 118 can receive the output of the topic identifier module 116; to disambiguate the information retrieval intent of the user, the intent chat hot 118 can generate a message that requests further input from the user. For instance, the message may be "The image that you provided includes a flower and a dog. Would you like more information about the flower or the dog?" The intent chat hot 118 can then cause the computing system 104 to transmit such message to the client computing device 102 by way of the network 106. The user of the client computing device 102 may set forth the response "the flower" to the client computing device 102 and cause the client computing device 102 to transmit such response to the computing system 104, whereupon the response is provided to the visual intent module 114.

The intent chat bot 118 receives the response and compares content of the response with the output of the topic identifier module 116. The intent chat bot 118, in this example, can ascertain that the user is interested in the topic "flowers". From the foregoing, it can be ascertained that the visual intent module 114 is configured to identify a topic in which the user of the client computing device 102 is interested based upon one or more of: 1) a query that includes multimodal input; and 2) information acquired from the user by way of an interactive exchange between the intent chat bot 118 and the user.

The visual search engine 112 also comprises a plurality of topic modules 120-122. Each of the topic modules 120-122 corresponds to a respective topic that can be identified by the visual intent module 114. Hence, in an example, the first topic module 120 may correspond to the topic "flowers" while the Nth topic module 122 may correspond to the topic "dogs". Due to the relatively large number of potential topics there may be a relatively large number of topic modules 120-122 in the visual search engine 112. For example, there may be 50 topic modules, 200 topic modules, 1000 topic modules, etc.

The first topic module 120 includes a first object identifier module 124 and a first topic chat bot 126. Similarly, the Nth topic module 122 includes an Nth object identifier module 128 and an Nth topic chat bot 130. In the exemplary system 100, the intent chat bot 118, the first topic chat bot 126, and the Nth topic chat bot 130 are different chat bots (although from the perspective of the end user it will appear as though the visual search engine 112 has a single chat bot). For instance, the intent chat bot 118 may be developed to interact with users in connection with ascertaining which topic is of interest to the users, the first topic chat bot 126 may be developed to interact with users with respect to the first topic, and the Nth topic chat bot 130 may be developed to interact with users with respect to the Nth topic. In another example, a single chat bot can be developed to interact with users with respect to several topics. Hence, the architecture depicted in FIG. 1 is exemplary in nature.

The first object identifier module 124 is configured to receive, from the visual intent module 114, images that include objects assigned to a topic to which the first topic module 120 corresponds, and is further configured to identify the objects in the images that are assigned to the topic. As indicated previously the first topic module 120 may correspond to the topic "flowers". Therefore, when the first object identifier module 124 is provided with an image that includes a flower, the first object identifier module 124 is configured to identify a type of the flower from amongst numerous potential types. Thus, when the image includes a tulip, the first object identifier module 124, upon being provided with the image, can output indication that the image includes a tulip (rather than a rose).

The first topic chat hot 126 is configured to: 1) receive text input; 2) receive output of the first object identifier module 124; and 3) provide information to the client computing device 102 based upon the text input and the output of the first object identifier module 124. In an example; the query received from the client computing device 102 may be an image of a tulip as well as the text "when does this flower bloom?" The visual intent module 114, as noted above, receives the query and determines that the user is interested in the topic "flowers" based upon the query. Upon determining that the user is interested in the topic "flowers", the visual intent module 114 passes the query to the first topic module 120 (which corresponds to the topic "flowers"), whereupon the image is provided to the first object identifier module 124. The first object identifier module 124 ascertains that the flower included in the image is a tulip and can output "tulip". The first topic chat bot 126 receives the output of the first object identifier module 124 and further receives the textual portion of the query. Based upon the output of the first object identifier module 124 and the textual portion of the query, the first topic chat bot 126 can transmit a message to the client computing device 102, such as "The flower in the image is a tulip. Tulips bloom in March and April."

In addition, the first topic chat bot 126 can request input from the user of the client computing device 102 and can generate additional output based upon input received from the user. For example, the image in the query may be somewhat blurry, and accordingly the first object identifier module 124 may be unable to identify a type of flower included in the image with a requisite amount of confidence. For example, the first object identifier module 124 can output an indication that it is 50% confident that the flower in the image is a tulip and 50% confident that the flower in the image is a rose. The first topic chat bot 126 can receive the output of the first object identifier module 124 and can generate a message based upon such output. For example, the message may be "I think that the flower is a rose or a tulip. Can you take a closer picture of the pedals." The first topic chat hot 126 can cause the computing system 104 to transmit such message to the client computing device 102 by way of the network 106. The user of the client computing device 102, in response to receiving such message, may capture another image of the flower and transmit such image back to the computing system 104. The first object identifier module 124 receives this image and ascertains, for example, with relatively high confidence that the flower captured in the image is a tulip. The first topic chat bot 126 receives output of the first object identifier module 124 and transmits a message to the client computing device 102 that indicates that the flower captured in the image is a tulip.

As noted above, the Nth topic module 122 includes the Nth object identifier module 128 that is configured to identify objects assigned to the Nth topic in images. The Nth topic module 122 additionally includes the Nth topic chat bot 130 that is configured to generate messages when the user of the client computing device 102 is attempting to acquire information about an object (in an image) that is assigned to the Nth topic.

The memory 110 can additionally include a search engine 132 that is in communication with the visual search engine 112. The search engine 132 can be a conventional search engine that receives a query and identifies webpages or other suitable information based upon the query. The intent chat bot 118 and/or the topic chat bots 126 and 130 can construct queries and transmit such queries to the search engine 132. The search engine 132 receives a query, identify search results based upon the query, and returns information included in at least one search result to the chat bot that transmitted the query to the search engine 132. The chat bot may then return the information to the client computing device 102. While shown as being included in the same memory as the visual search engine 112, it is to be understood that the search engine 132 may execute on different servers than the servers that execute the visual search engine 112.

Continuing with the example where the image includes a flower, the first object identifier module 124 can generate an output that indicates that the image includes a tulip. The first topic chat bot 126 can receive such output and can construct a query that comprises the keyword "tulip" and transmit the constructed query to the search engine 132. The search engine 132 receives the query and retrieves information relating to tulips by performing a search based upon the query. The search engine 132 may then return the information to the first topic chat bot 126, wherein the information, for example, may include information about tulips found on a webpage that is available by way of the World Wide Web. The first topic chat bot 126 generates a message that includes the information and transmits such message to the client device 102, whereupon the user of the client computing device 102 can review such information.

In summary, the visual search engine 112 is configured to receive a query, wherein the query may be multimodal in nature. The visual intent module 114, based upon the query (and optionally further based upon additional information provided by the user of the client computing device 102 in response to a request for information generated by the intent chat bot 118), identifies a topic that is of interest to the user of the client computing device 102 and transmits the query to the appropriate topic module.

The topic module that receives the query, ascertains information that is relevant to the query, and returns such relevant information to the client computing device 102. As noted previously, a topic chat bot can be configured to interact with the user of the client computing device 102 to provide the user of the client computing device 102 with information that is relevant to the information retrieval intent of such user.

Figure 2:
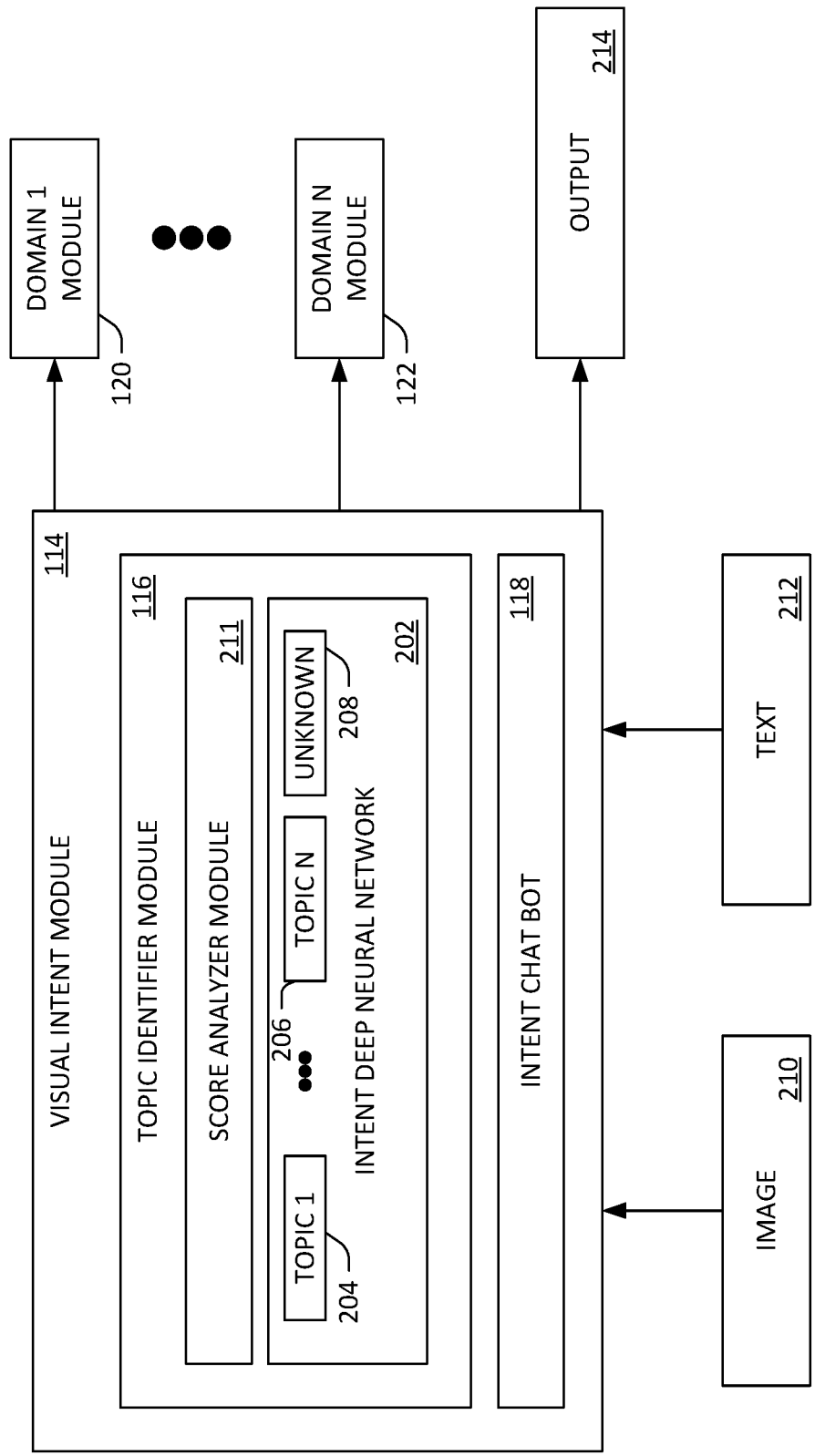
FIG. 2 is a functional block diagram of an exemplary module that is configured to identify a topic of interest to a user.

Referring now to FIG. 2, an exemplary functional block diagram of the visual intent module 114 is illustrated. As described previously, the visual intent module 114 comprises the topic identifier module 116 and the intent chat bot 118. In an exemplary embodiment, the topic identifier module 116 includes an intent deep neural network (DNN) 202. For instance, the intent DNN 202 can be or include a recurrent neural network (RNN) such as a contextual neural network. The intent DNN 202 includes a plurality of output nodes 204-206 that respectively represent topics. Therefore, the first output node 204 represents the first topic and the Nth output node represents the Nth topic. The intent DNN 202 may also include an "unknown" output node 208 that represents an "unknown" topic.

The intent DNN 202 is configured to receive an image 210 that has been transmitted to the visual search engine 112 by the client computing device 102. The intent DNN 202 receives the image 210 as input and generates, for example, a distribution of confidence values over the output nodes 204-206 and 208. Hence, each output node 204-206 and 208 is assigned a respective confidence score, where a higher a confidence score assigned to an output node the more confident the intent DNN 202 is that an object in the image 210 is assigned to a topic represented by the output node. In an example, the first output node 204 can represent the topic "flowers" while the Nth output node 206 can represent the topic "dogs". When the image 210 includes a flower but does not include a dog, the intend DNN 202 can assign a first score to the first output node 204 and an Nth score to the Nth output node 206, wherein the first score is higher than the Nth score.

The topic identifier module 116 further includes a score analyzer module 211 that receives the confidence scores assigned to the output nodes 204-208 and ascertains whether the intent DNN 202 has confidently identified a topic based upon the image 210. For instance, the score analyzer module 211 can compare a confidence score assigned to the first output node 204 with a predefined threshold, wherein when the confidence score is above the predefined threshold the score analyzer module 211 can output an indication that the intent DNN 202 has identified that an object included in the image 210 is assigned to the first topic. In another example, the score analyzer module 211 can identify two highest scores assigned to the plurality of output nodes 204-208 and can compare a difference between the two highest scores with a predefined threshold. When the difference is greater than the predefined threshold, the score analyzer module 211 can output an indication that the image includes an object that is assigned to the topic represented by the output node with the highest score. When the difference between the two highest scores is less than the predefined threshold, the score analyzer module 211 can output an indication that the image includes an object that is assigned to one of two topics.

The intent chat bot 118 receives output of the score analyzer module 211. Additionally, the intent chat bot 118 can optionally receive text 212 from the client computing device 102 as a portion of the query transmitted from the client computing device 102. The intent chat bot 118 can utilize the text 212 to disambiguate between topics that the user may be interested in (as output by the score analyzer module 211). When the topic identifier module 116 is unable to confidently identify a topic and when the intent chat bot 118 is unable to disambiguate the intent of the user based upon the text 212, the intent chat bot 118 can generate output 214 that includes a request for additional information from the user of the client computing device 102. The output 214 may be a request for text input, a request for another image, etc. The user of the client computing device 102 can generate a response to such output 214 and the response can be provided to the intent chat bot 118, and the intent chat hot 118 can disambiguate between potential topics based upon the response.

Once the topic identifier module 116 has identified a topic, the topic identifier module 116 causes the image 210 and the text 212 (if received) to be transmitted to the topic module that corresponds to the topic (from amongst the plurality of topic modules 120-122). In an example, when the topic identifier module 116 identifies the first topic based upon the image 210 and/or the text 212, the topic identifier module 116 can cause the image 210 and/or the text 212 to be provided to the first topic module 120.

Figure 3:
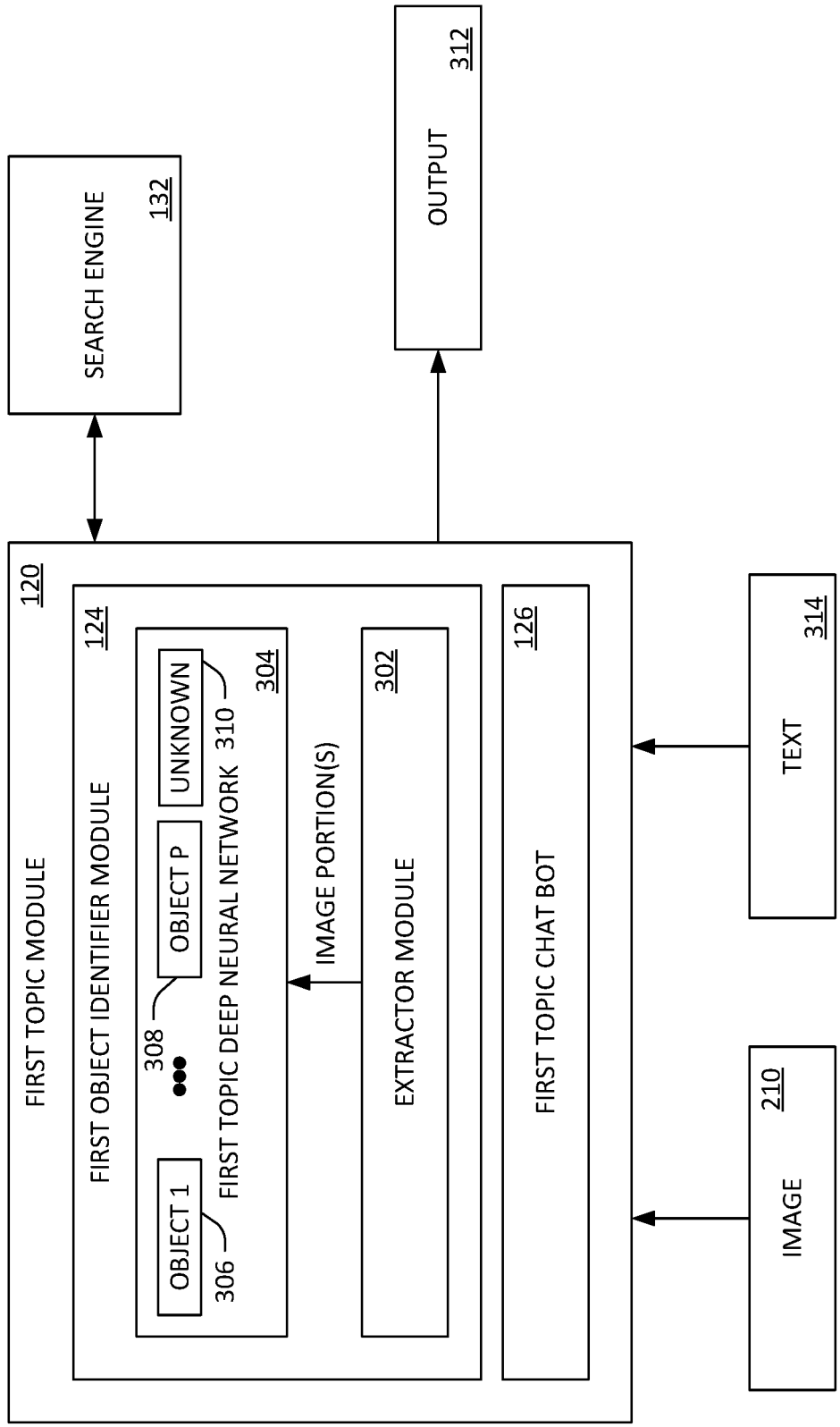
FIG. 3 is a functional block diagram of an exemplary module that is configured to interact with a user to disambiguate an information retrieval intent of the user.

Now referring to FIG. 3, an exemplary functional block diagram of the first topic module 120 is depicted. As noted above, the first topic module 120 comprises the first object identifier module 124 and the first topic chat bot 126. The first object identifier module 124 can include an extractor module 302 that is configured to position bounding boxes around objects that belong to the first topic (e.g., "flowers") in the image 210. Therefore, for example, when the image 210 includes multiple flowers, the extractor module 302 can draw bounding boxes around each flower in the multiple flowers, thereby filtering out background of the image 210. In an example, the extractor module 302 can include an Artificial Neural Network (ANN) that is configured to position the bounding boxes around the objects.

The first object identifier module 124 additionally includes a first topic DNN 304 that is configured to receive the portions of the image 210 extracted from the image 210 by the extractor module 302. As with the intent DNN 202, the first topic DNN 304 can be or include an RNN, such as a convolutional neural network. It is to be understood that other types of ANNs are contemplated. The first topic DNN 304 comprises a plurality of output nodes 306-308 that represent types of objects that belong to the first topic. The first topic DNN 304 also includes an output node 310 that represents an "unknown" type. For instance, the first output node 306 may represent the flower type "tulip", a second output node may represent the flower type "rose", a third output node may represent a flower type "daisy", and so forth.

The first topic chat bot 126 receives output of the first topic DNN 304 and generates an output 312 based upon the output of the first topic DNN 304. For example, the output 312 may include a request that is to be sent to the client computing device 102 for additional information (wherein the additional information can be used to disambiguate the information retrieval intent of the user). In another example, the output 312 may be a second image that includes an object that is related to the object 107 captured in the image 210. In yet another example, the output 312 can include a recommendation to explore the topic.

In a nonlimiting example, the image 210 may include two flowers: a rose and a tulip. The extractor module 302 can place bounding boxes around such two flowers in the image 210, thereby extracting portions of the image 210 that include the two flowers. The extractor module 302 may then pass the portions of the image (separately) to the first topic DNN 304. The first topic DNN 304 can output an indication that the first image portion includes a flower of type "tulip"

while the second image portion includes a flower of type "rose". The first topic chat bot 126 receives this indication. In an example, upon receiving this indication, the first topic chat bot 126 can generate the output 312, wherein the output 312 includes a request that the user identify which of the two flowers in the image 210 the user is interested in. For example, the first topic chat bot 126 can generate the message "The image includes a tulip and a rose. Are you interested in tulips or roses?" The output 312 can be transmitted to the client computing device 102 and the user of the client computing device 102 can set forth text 314 to the client computing device 102 that identifies which of the two flowers the user is interested in.

For example, the user may set forth the response "The flower on the right." When the extractor module 302 extracts the portions of the image from the image 210, the extractor module 302 may assign attribute values to such portions, wherein the attribute values can identify positions of the image portions (and thus flowers in the image portions) relative to one another. Exemplary attribute values can include "top", "bottom", "left", "right", "middle", "first", "second", "last", etc.). The first topic chat bot 126 can ascertain that the user is interested in the rose and not the tulip, as the image portion that includes the rose is to the right of the image portion that includes the tulip. The first topic chat bot 126 can then transmit a query to the search engine 132 upon ascertaining that the user was interested in the rose, wherein the query may be, for example, "rose flower". The search engine 132 can return information identified based upon such query to the first topic module 120, and the first topic chat bot 126 can transmit the output 312 to the client computing device 102, wherein the output may include the information about the rose returned by the search engine 132.

It is noted that inclusion of the first topic chat bot 126 in the first topic module 120 facilitates the virtual search engine 112 interacting with the user of the client computing device 102 to disambiguate the information retrieval intent of the user. In addition, inclusion of the first topic chat bot 126 in the first topic module 120 facilitates return of information to the user of the client computing device 102 that is based upon text set forth by the user of the client computing device 102 (in addition to the information being relevant to the contents of the image 210).

FIGS. 4-17 depict exemplary graphical user interfaces (GUIs) that can be presented on a display of the client computing device 102 to facilitate performance of a visual search (a search based upon an image). The GUIs presented in FIGS. 4-17 may be displayed in a web browser, as GUIs for an application that is dedicated to performing visual searches, as GUIs of a personal digital assistant, etc.

Figure 4:
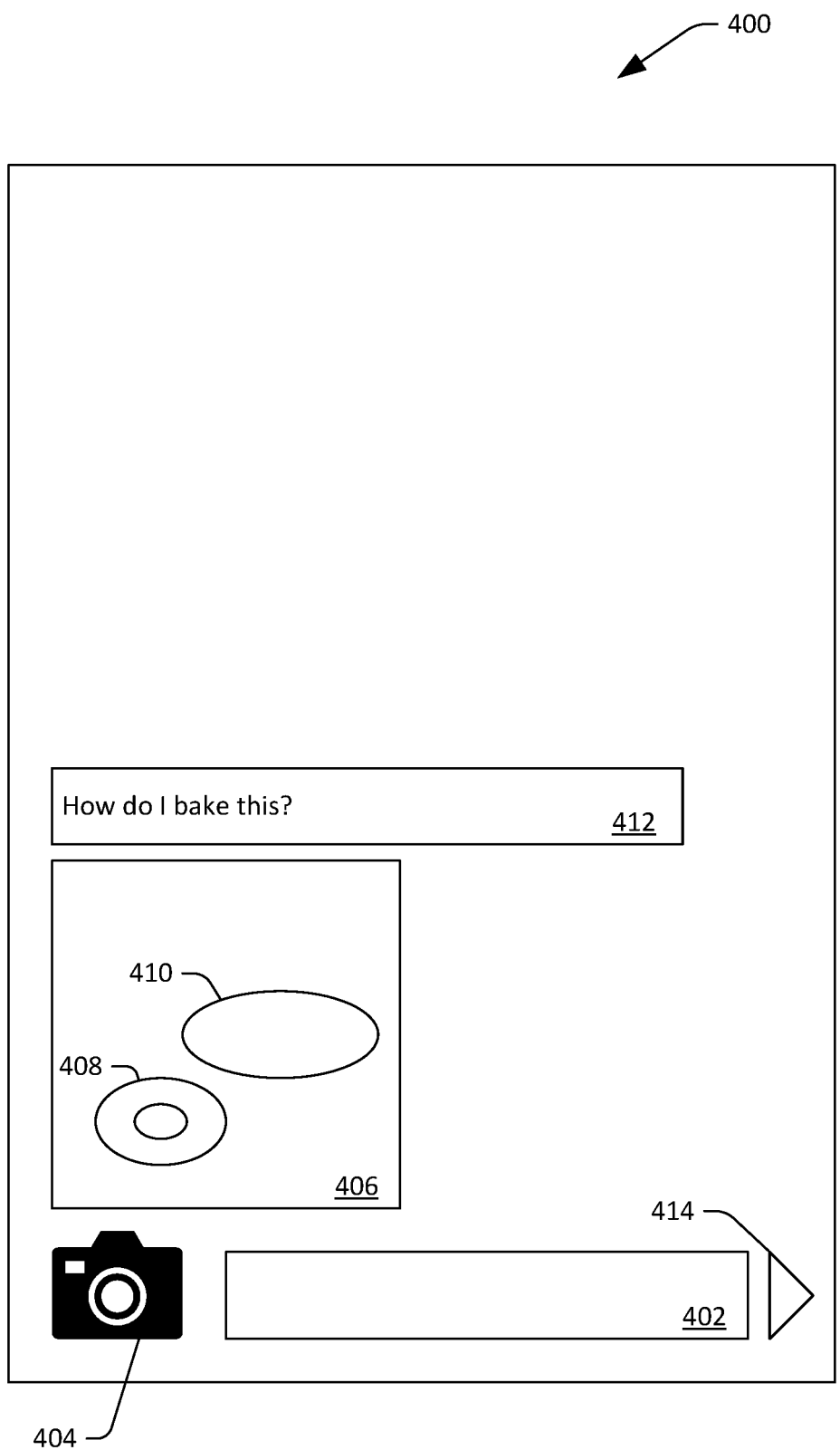
FIGS. 4-17 depict exemplary graphical user interfaces (GUIs) that correspond to a visual search engine.

Referring solely to FIG. 4, an exemplary GUI 400 that can be presented on a display of the client computing device 102 is illustrated. The GUI 400 comprises a text entry field 402, wherein the text entry field 402 is configured to receive and/or depict text that is to be transmitted to the visual search engine 112. In an example, the user of the client computing device 102 can select the text entry field 402 and can use a keyboard to set forth text into the text entry field 402. In another example, the GUI 400 may include a button (not shown), wherein a microphone is activated when the button is selected. The microphone captures voice input of the user, and such voice input can be transcribed to text, and the transcribed text can be presented in the text entry field 402. The client computing device 102 or a computing device in network communication with the client computing device 102 can transcribe the text.

The GUI 400 further includes an icon 404 that is selectable by the user of the client computing device 102. When the icon 404 is selected, for example, a camera application of the client computing device 102 can be activated and the client computing device 102 can be operated to capture an image of an object. In another example, when the icon 404 is selected, a plurality of selectable images can be presented on the display of the client computing device 102, and the user can select one of the selectable images for provision to the visual search engine 112.

In the example shown in FIG. 4, the icon 404 has been selected by the user of the client computing device 102 and the user of the client computing device 102 has operated the client computing device 102 to generate an image 406. The image 406 includes two baked goods: a donut 408 and a croissant 410. Additionally, the GUI 400 depicts text 412 that the user has set forth by way of the text entry field 402: "How do I bake this"? The GUI 400 further includes a button 414, wherein the image 406 and the text 412 (collectively a query) are transmitted to the visual search engine 112 upon the user selecting the button 414.

Figure 5:
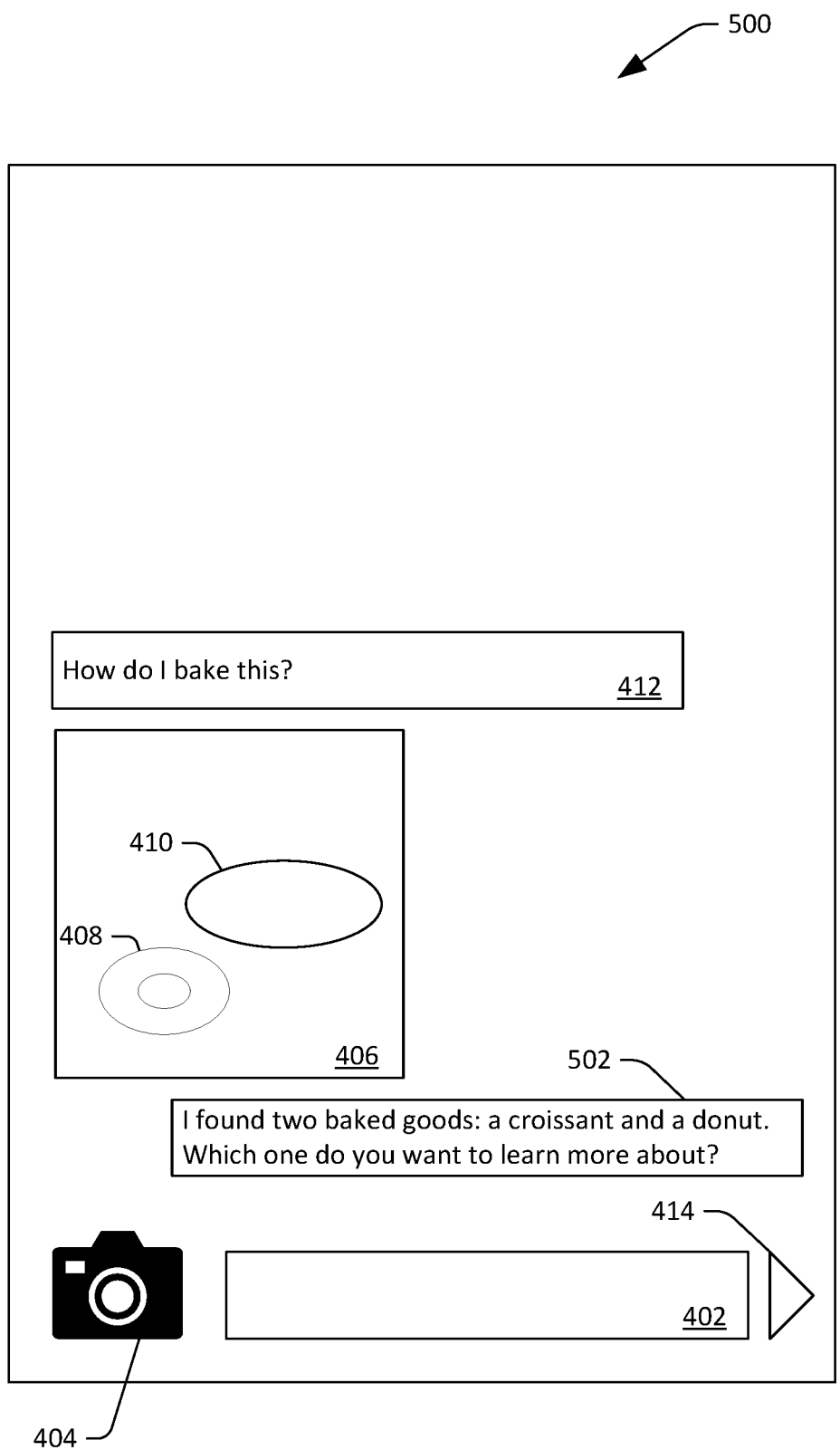

Now referring to FIG. 5, an exemplary GUI 500 is depicted that facilitates interaction between the user of the client computing device 102 and the visual search engine 112. The GUI 500 comprises a message 502 generated by a chat bot that is assigned, for example, to a "baked goods" topic. With more particularly, the visual search engine 112 receives the query (the image 406 and the text 412). As the query is a newly received query, the query is provided as input to the visual intent module 114. The topic identifier module 116 determines that the image 406 comprises two objects that belong to the "baked goods" topic and generates an output indicating that the image 406 includes objects that belong to the "baked goods" topic. The intent chat bot 118 receives the text "How do I bake this" and extracts the verb "bake" from the text 412. The intent chat bot 118 can compare the extracted verb with the topic(s) output by the topic identifier module 116 and based upon such comparison can ascertain that the user is interested in information belonging to the topic "baked goods". The visual intent module 114 then transmits the image 406 and the text 412 to a topic module from the topic modules 120-122 that corresponds to the topic "baked goods". For instance, the Nth topic module 122 may correspond to the topic "baked goods".

The Nth topic module 122 receives the query (the image 406 and the text 412). The Nth object identifier module 128 ascertains that the image 406 includes the donut 408 and the croissant 410, and further assigns the attribute value "left" to the donut 408 and the attribute value "right" to the croissant 410. The Nth object identifier module 128 generates output, wherein the output includes the labels "donut" and "croissant" and attribute values "left" and "right" that are respectively assigned to the labels. The Nth topic chat bot 130 receives the output generated by, the Nth object identifier module 128, and based upon such output generates the message 502 depicted in the GUI 500. Hence, the Nth chat bot 130 has generated a message that requests information that allows the Nth topic module 122 to disambiguate the information retrieval intent of the user of the client computing device 102.

Figure 6:
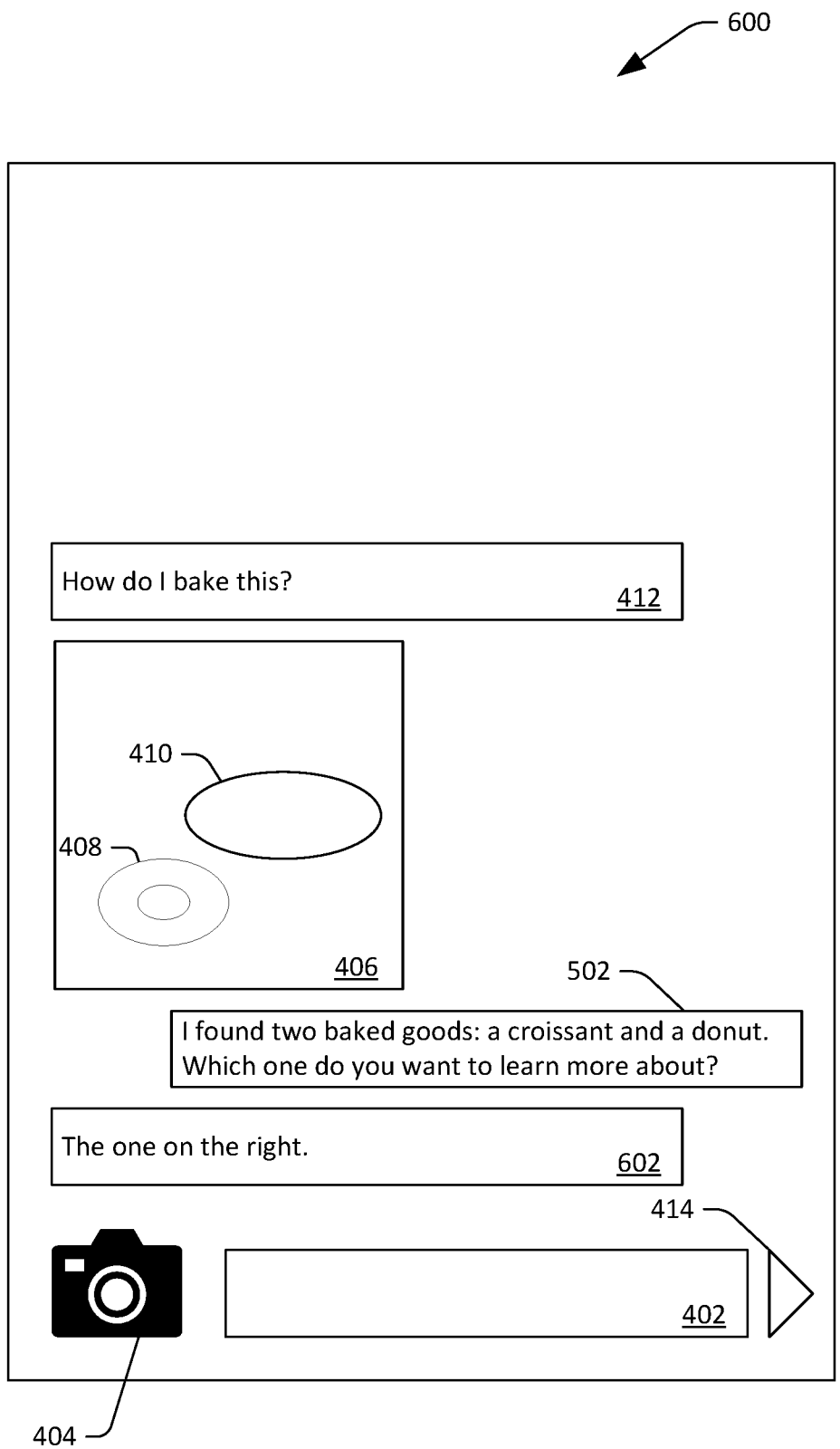

Now referring to FIG. 6, an exemplary GUI 400 that can be presented on the display of the client computing device 102 upon the user of the client computing device 102 setting forth a response to the message 502 by way of the text input field 402 is illustrated. In the example shown in FIG. 6 the user has set forth a response 602 "The one on the right." The visual search engine 112 retains a state of the search, and accordingly the response is provided to the Nth topic chat bot 130.

Figure 7:
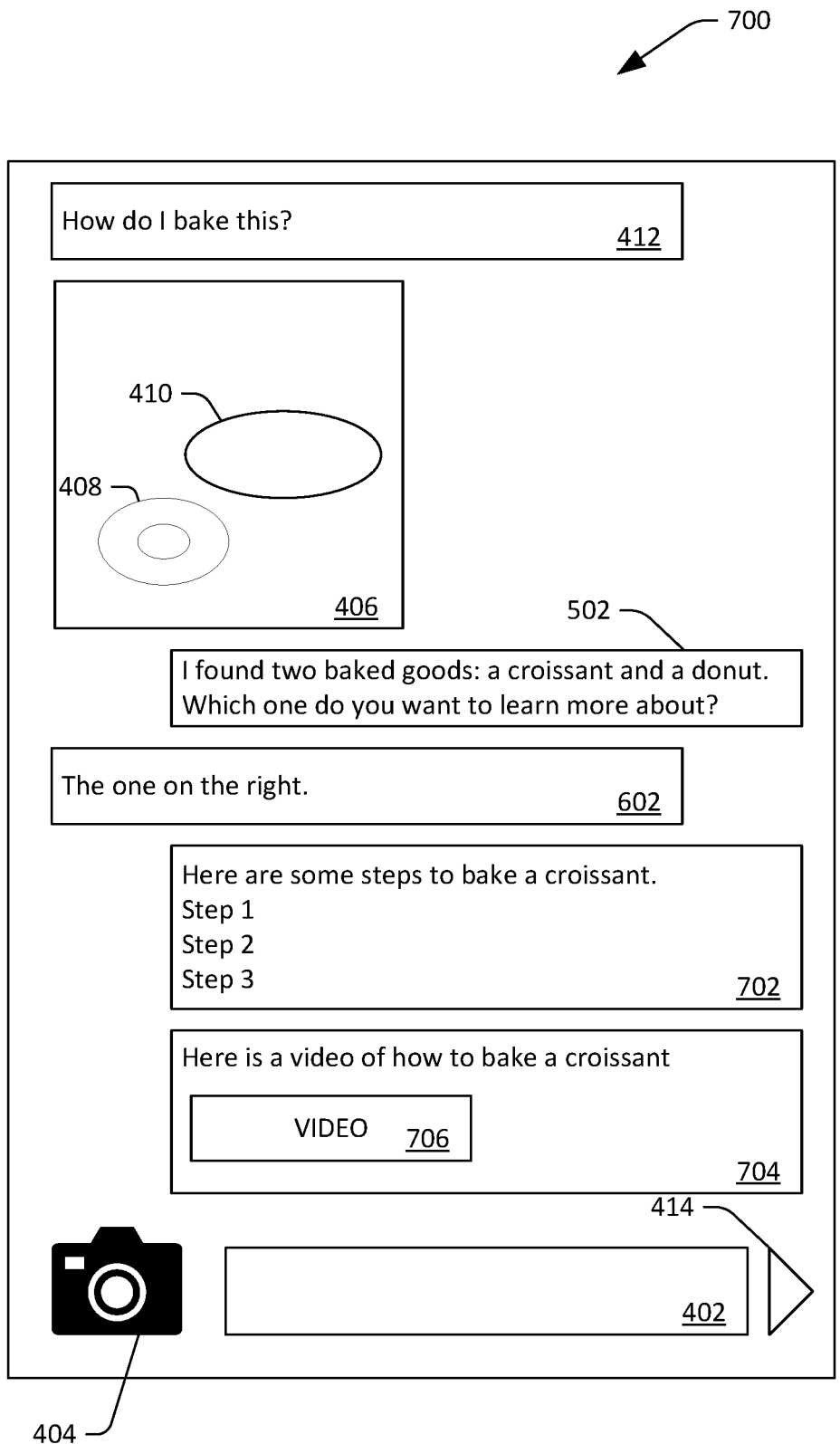

Turning to FIG. 7, an exemplary GUI 700 presented on the client computing device 102 upon the Nth topic chat bot 130 receiving the response 602 is illustrated. The Nth topic chat bot 130 extracts the term "right" from the response 602 and compares such term with attribute values assigned to the object labels by the Nth object identifier module 128 (e.g., that the croissant 410 is to the right of the donut 408). Based upon such comparison, the Nth topic chat bot 130 determines that the user of the client computing device 102 has identified the croissant (and not the donut). In addition, the Nth topic chat bot 130 can construct a query that is based upon the text 412 and the response 602; for instance, the Nth topic chat bot 130 can replace "this" in the text 412 with "a croissant", thereby creating the query "how do I bake a croissant?" The Nth topic chat bot 130 transmits such query to the search engine 132, and the search engine 132 can execute a search and return information to the Nth topic chat hot 130 that is relevant to the query. For example, the Nth topic chat bot 130 can return steps 702 for baking a croissant and may further return a message 704 that comprises a video 706 for baking a croissant. The video 706 can be played in the GUI 700, such that the user need not exit the GUI 700 to watch the video 706.

From the exemplary GUIs depicted in FIGS. 4-7, it can be ascertained that the visual search engine 112 is configured to receive a multimodal query (the text 412 and the image 406), and is configured to identify a topic based upon one or more of the text 412 and the image 406. The visual search engine 112 is further configured to interact with the user of the client computing device 102 to disambiguate the information retrieval intent of the user of the client computing device 102, and is additionally configured to provide information to the user that is relevant to the disambiguated information retrieval intent of the user. In contrast, a conventional visual search engine is configured to receive the image 406 (and not the corresponding text 412), and may output information that is not germane to the information retrieval intent of the user (such as country of origin of donuts and/or croissants, calories in donuts and/or croissants, etc.).

Figure 8:
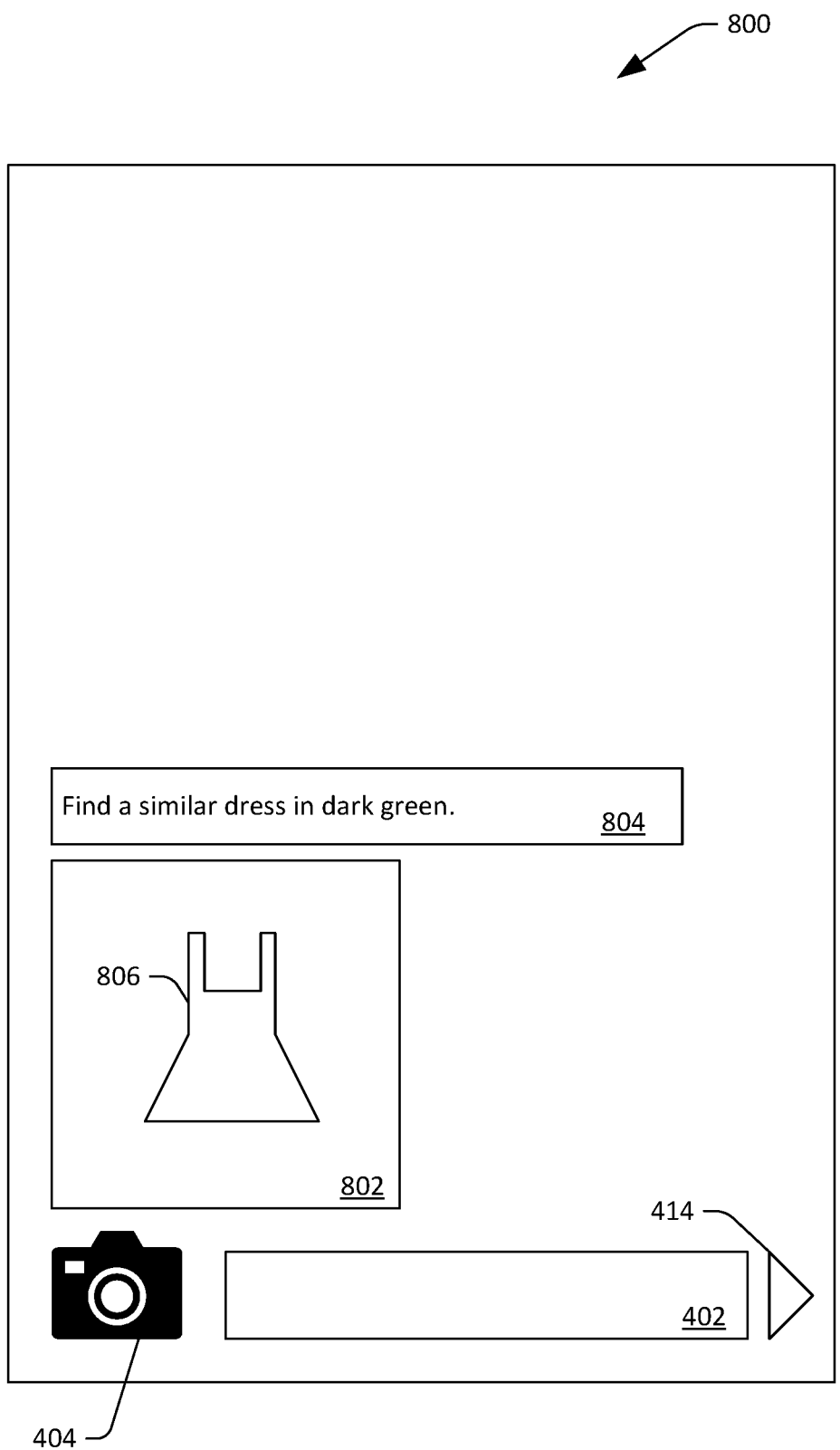

Referring now to FIG. 8, an exemplary GUI 800 depicting a query provided to the visual search engine 112 is illustrated. In this example, the user has uploaded a query that includes an image 802 and text 804 to the visual search engine 112, wherein the text is "Find a similar dress in dark green", and the image 802 includes a dress 806. The query is provided to the visual intent module 11A. The topic identifier module 116 determines that the image 802 includes an object that belongs to the topic "clothing" (e.g., the dress 806), and generates an output that indicates that the image 802 has been assigned the label "clothing". The intent chat bot 118 receives such label and additionally receives the text 804, extracts the keyword "dress" from the text 804, and identifies the term as corresponding to the topic "clothing". Therefore, the visual intent module 114 can determine that the information retrieval intent of the user pertains to the topic "clothing", and can cause the query (the image 802 and the text 804) to be provided to a topic module that corresponds to the topic "clothing" from amongst the plurality of topic modules 120-122. In an example, the first topic module 120 may correspond to the topic "clothing" and may be provided with the multimodal query.

Figure 9:
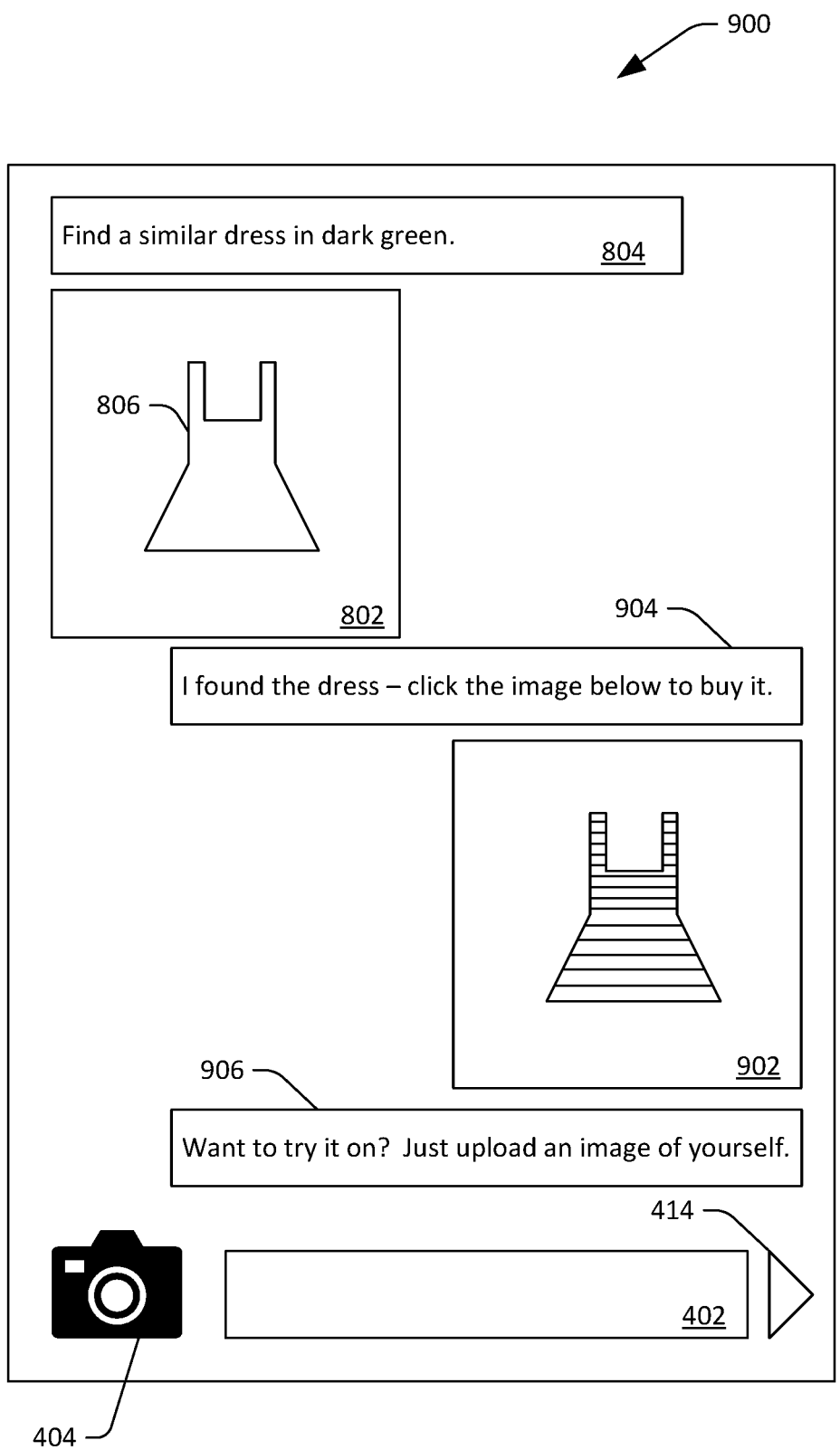

Referring now to FIG. 9, an exemplary GUI 900 depicting output of the visual search engine 112 in response to the visual search engine 112 receiving the multimodal query is illustrated. For example, the first topic module 120 can receive the image 802 and the first object identifier module 124 can be configured to output label(s) that identify, for example, a type of the dress (e.g. cocktail, formal, ballroom, etc.), a designer of the dress, etc. The first topic chat bot 126 may then construct a query and transmit such query to the search engine 132, wherein the query can include keywords that comprise, for example, a type of the dress, a designer of the dress, and the color "dark green". In another example, the visual search engine 112 conduct an image search over a plurality of images based upon the image 802 to find images that comprise dresses that are similar to the dress 806 included in the image 802, and can filter the images to remove those where the similar dresses are not dark green.

An image 902 identified as including a similar dress in dark green is returned to the first topic chat bot 126. The first topic chat bot 126 constructs a message 904 that informs the user of the client computing device 102 that the visual search engine 112 has identified a dress that matches the intent of the user of the client computing device 102, and causes the image 902 and the message 904 to be presented in the GUI 900. In addition, the visual intent module 114 can assign a hyperlink to the image 902, such that selection of the image 902 may direct a browser to load a webpage where the dress included in the image 902 can be purchased. In addition, the first topic chat bot 126 returns a message 906 to the client computing device 102, wherein the message 906 prompts the user of the client computing device 102 to perform another action related to the dress depicted in the image 902. For example, the message can prompt the user to upload an image of herself to the visual search engine 112.

Figure 10:
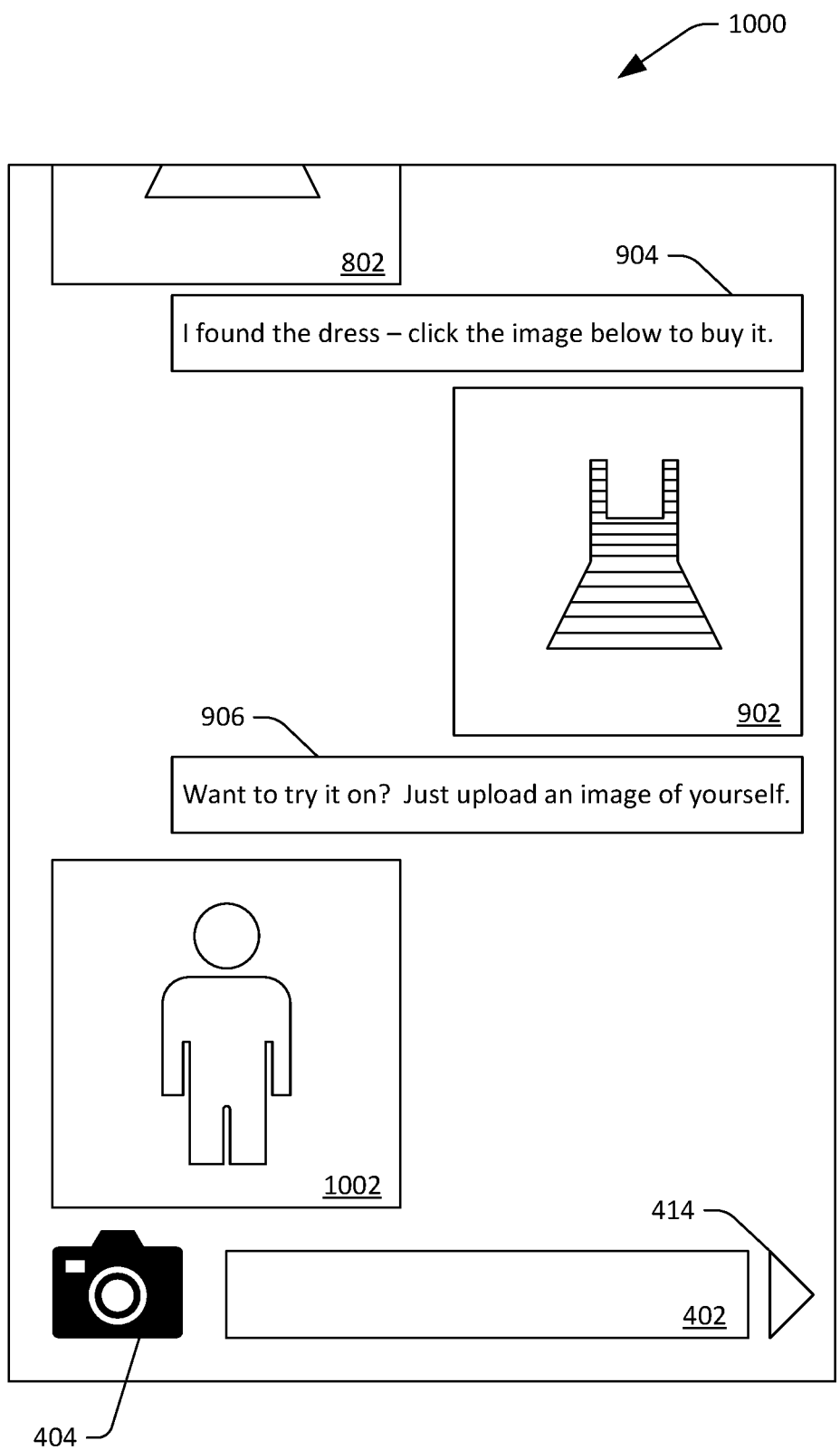
Figure 11:
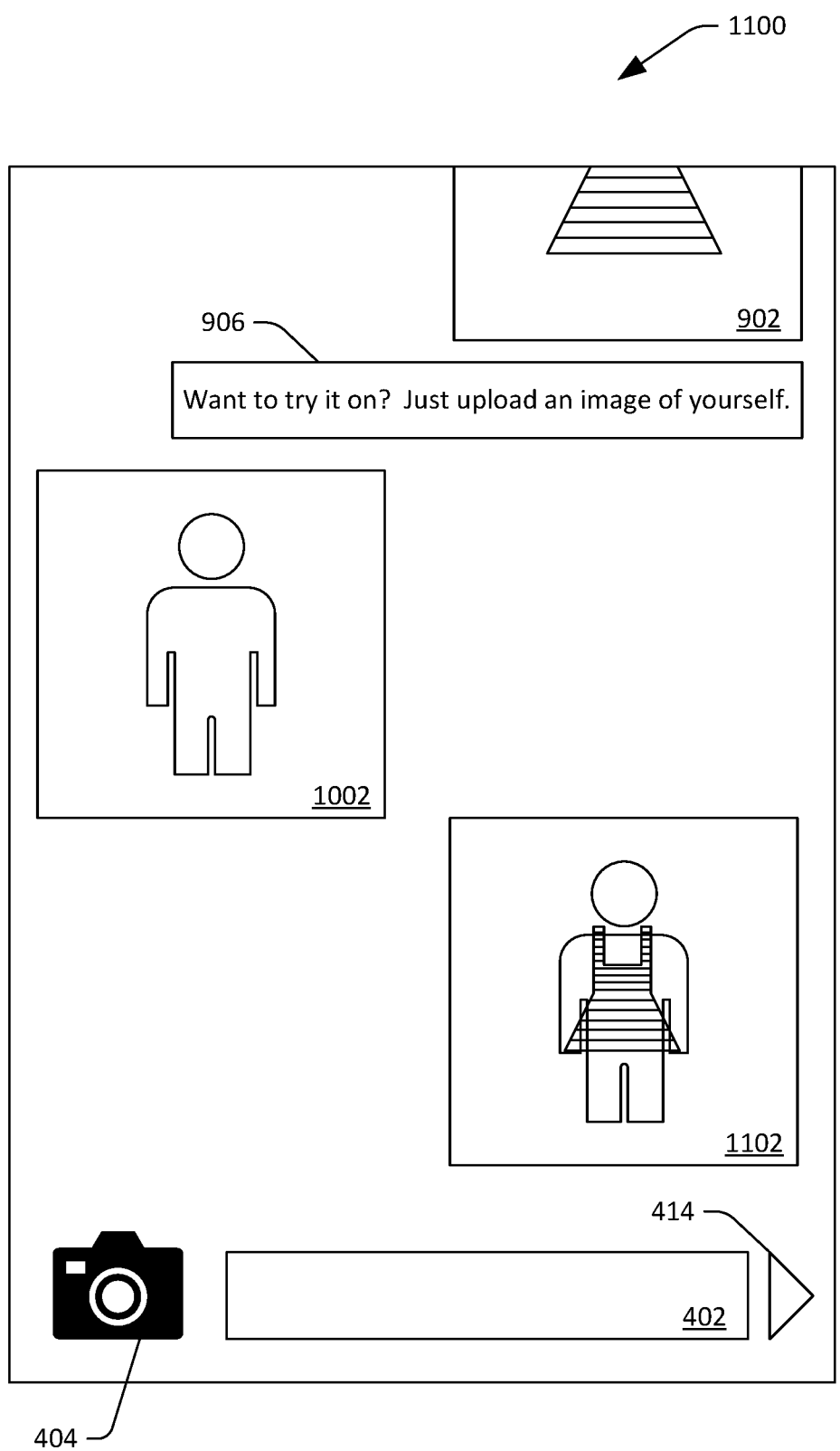

FIG. 10 illustrates another GUI 1000, wherein the user of the client computing device 102, in response to receiving the message 906, uploads an image 1002 of herself to the visual search engine 112. The first topic chat hot 126 receives an indication that the image has been uploaded in response to the message 906 and transmits the image 1002 to a computer-implemented service that is configured to virtually place the dress shown in the image 902 onto the user as presented in the image 1002. The computer-implemented service can return an image that includes the user with the green dress thereon to the first topic chat bot 126, which can transmit such image to the client computing device 102 for review by the user. For example, FIG. 11 depicts a GUI 1100 that comprises an image 1102 returned by the first topic chat bot 126, wherein the image 1102 captures the user of the client computing device 102 as represented in the image 1002 modified such that the user appears to be wearing the dress from the image 902.

Figure 12:
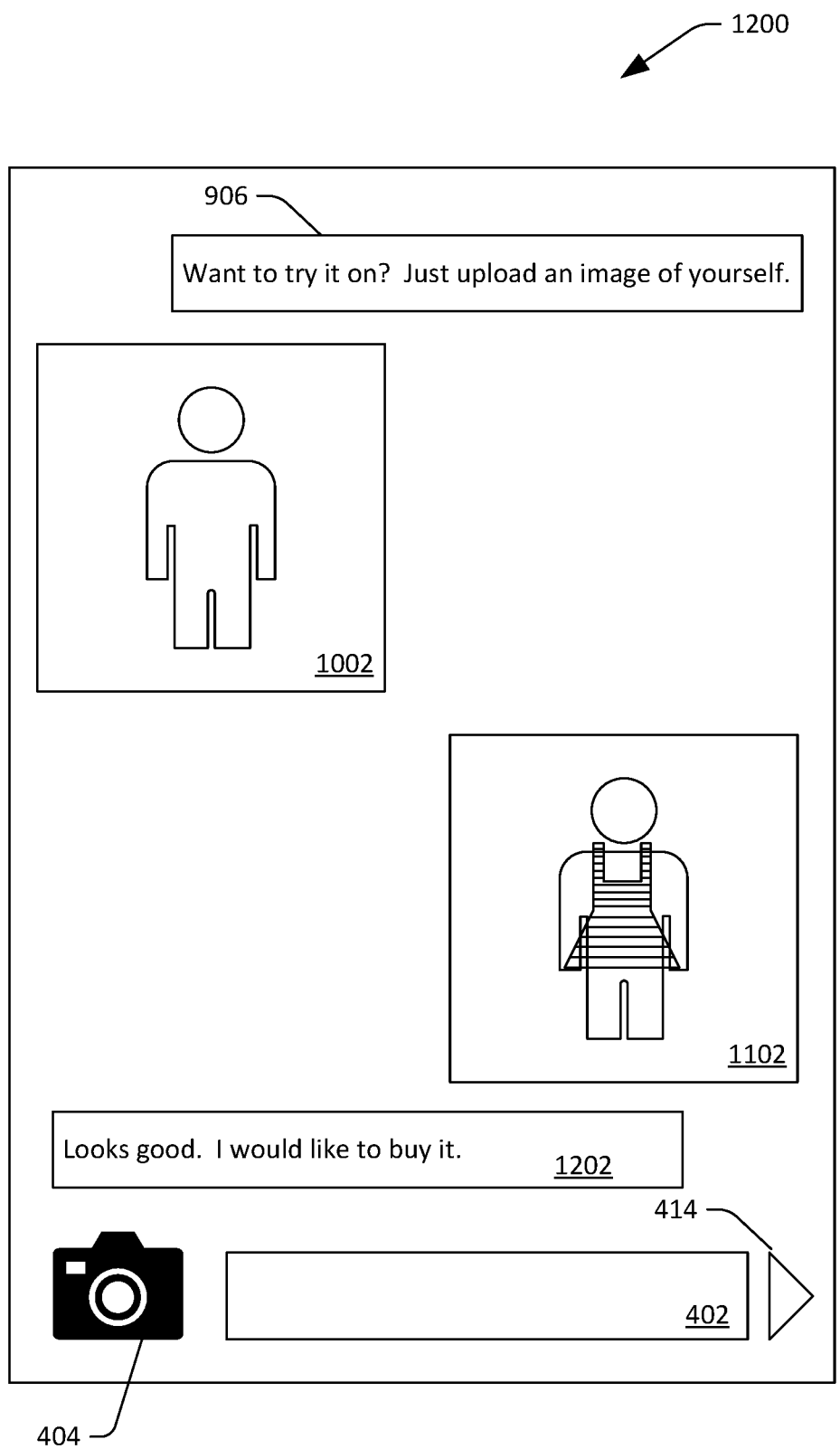

Referring now to FIG. 12, another exemplary GUI 1200 depicting interactions between the visual search engine 112 and the user of the client computing device 102 is illustrated. In the exemplary GUI 1200, it can be ascertained that the user of the client computing device 102 has observed the image 1102 and decided to purchase the dress. Accordingly, the user of the client computing device 102 sets forth a message 1202 (e.g., by way the text entry field 402) that indicates that the user of the client computing device 102 would like to purchase the dress identified by the visual search engine 112.

Figure 13:
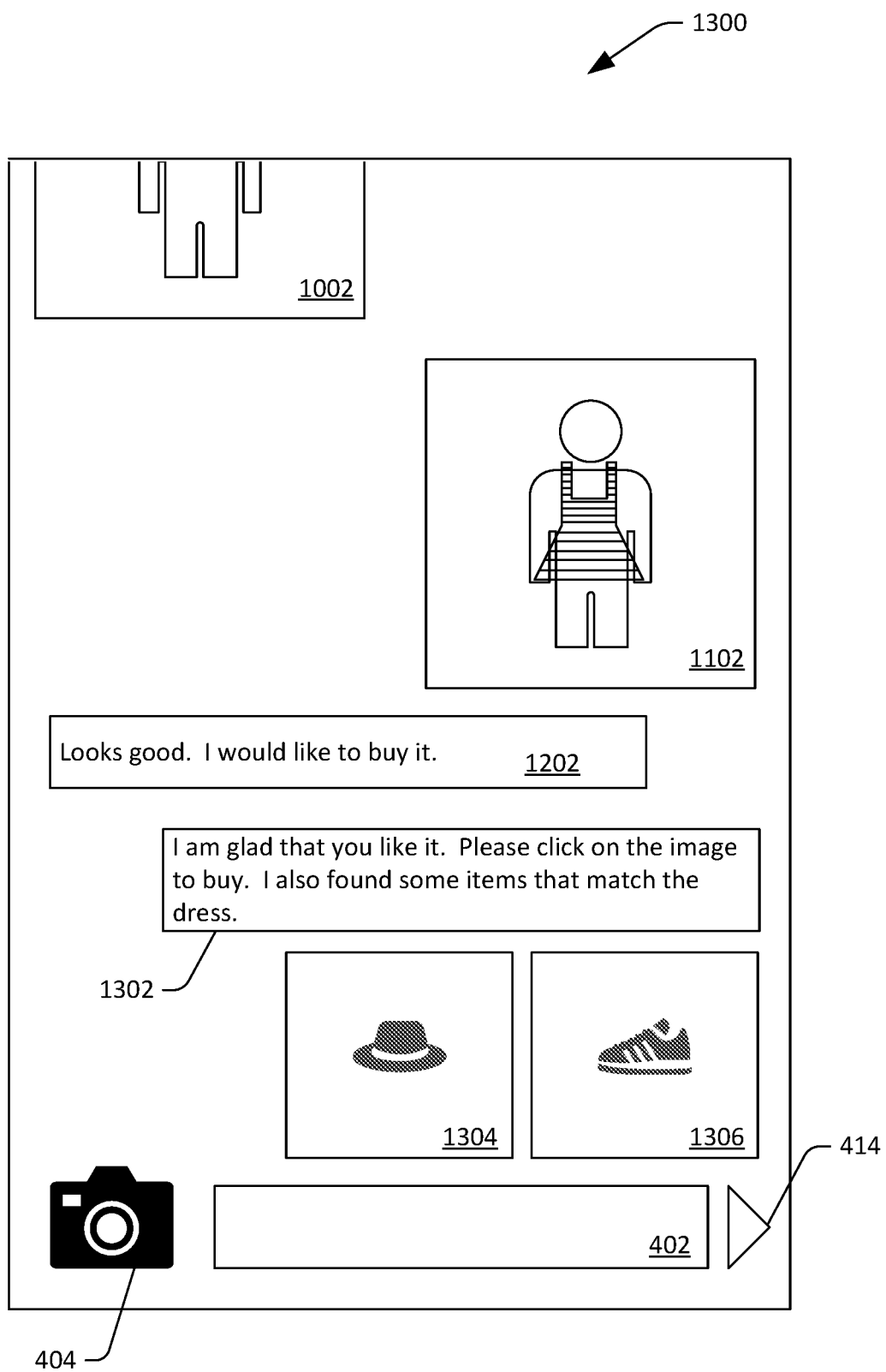

FIG. 13 illustrates an exemplary GUI 1300 that depicts a further interaction between the user of the client computing device 102 and the visual search engine 112. In response to receiving the message 1202 from the client computing device 102, the first topic chat hot 126 constructs a response message 1302 that includes instructions for the user to complete the purchase. For example, the first topic chat bot 126 can employ natural language processing (NLP) technologies to ascertain that the user intends to buy the address and can construct the response message 1302 based upon the ascertained intent of the user. In addition, upon the first topic module 120 ascertaining that the user has an interest in the dress captured in the image 902, the first topic module 120 can request that the search engine 132 return images of objects related to the dress. For example, the first topic chat bot 126 can construct a query that includes the image 902 of the dress and descriptors of such dress and request that the search engine 132 return images that include objects that are related to the dress shown in the image 902. The search engine 132, in this example, returns two images 1304 and 1306 to the visual search engine 112 and the visual search engine 112 can transmit the images 1304 and 1306 to the client computing device 102 for display to the user. As illustrated, the images 1304 and 1306 include articles of clothing that match the dress.

The GUIs depicted in FIGS. 8-13 have been set forth to illustrate various aspects pertaining to the visual search engine 112. Specifically, the visual search engine 112 is configured to return search results (e.g., the image 902) based upon a multimodal query. In contrast, a conventional visual search engine is only, configured to receive an image. Hence, if the user were to provide a conventional visual search engine with the image 802, the conventional visual search engine may provide the user with an image of the dress to allow the user to purchase such dress. However, as illustrated in the textual portion of the multimodal query, the user is interested in purchasing the dress in dark green and is not interested in purchasing the dress with the color as represented in the image 802. In addition, the visual search engine 112 is configured to communicate with the user of the client computing device 102 by presenting the user with options related to the returned image 902. Thus, the visual search engine 112 is configured to call a computer-implemented service to provide information to the user. Finally, the visual search engine 112 is configured to return images that are related to the image 902 returned by the visual search engine 112, such that items in the images 1304 and 1306 match the dress shown in the returned image 902 rather than the image 802 initially provided by the user. Thus, through a multistep interaction, the visual search engine 112 is able to provide the user of the client computing device 102 with information that is relevant to the information retrieval intent of the user.

Figure 14:
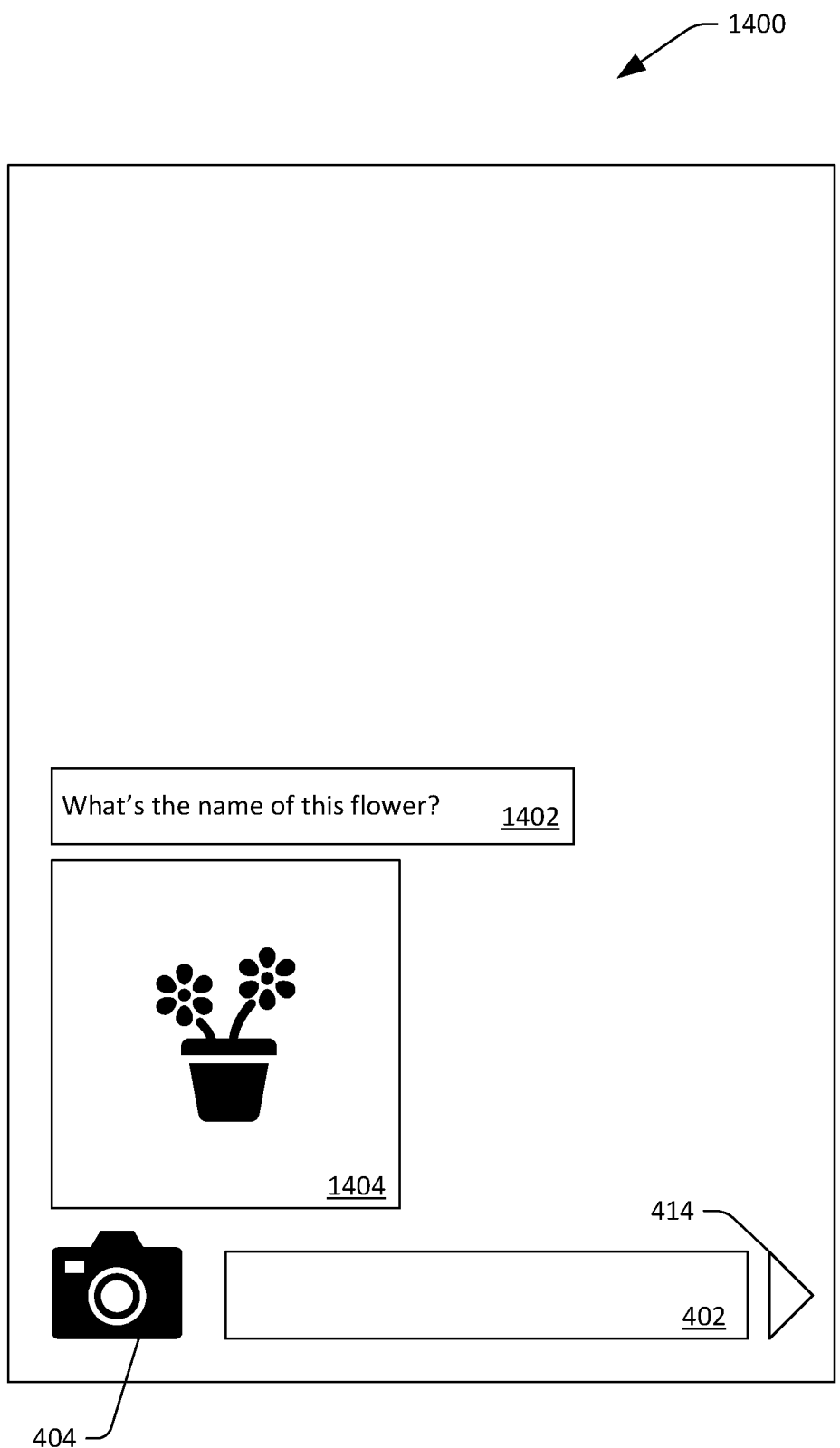
Figure 15:
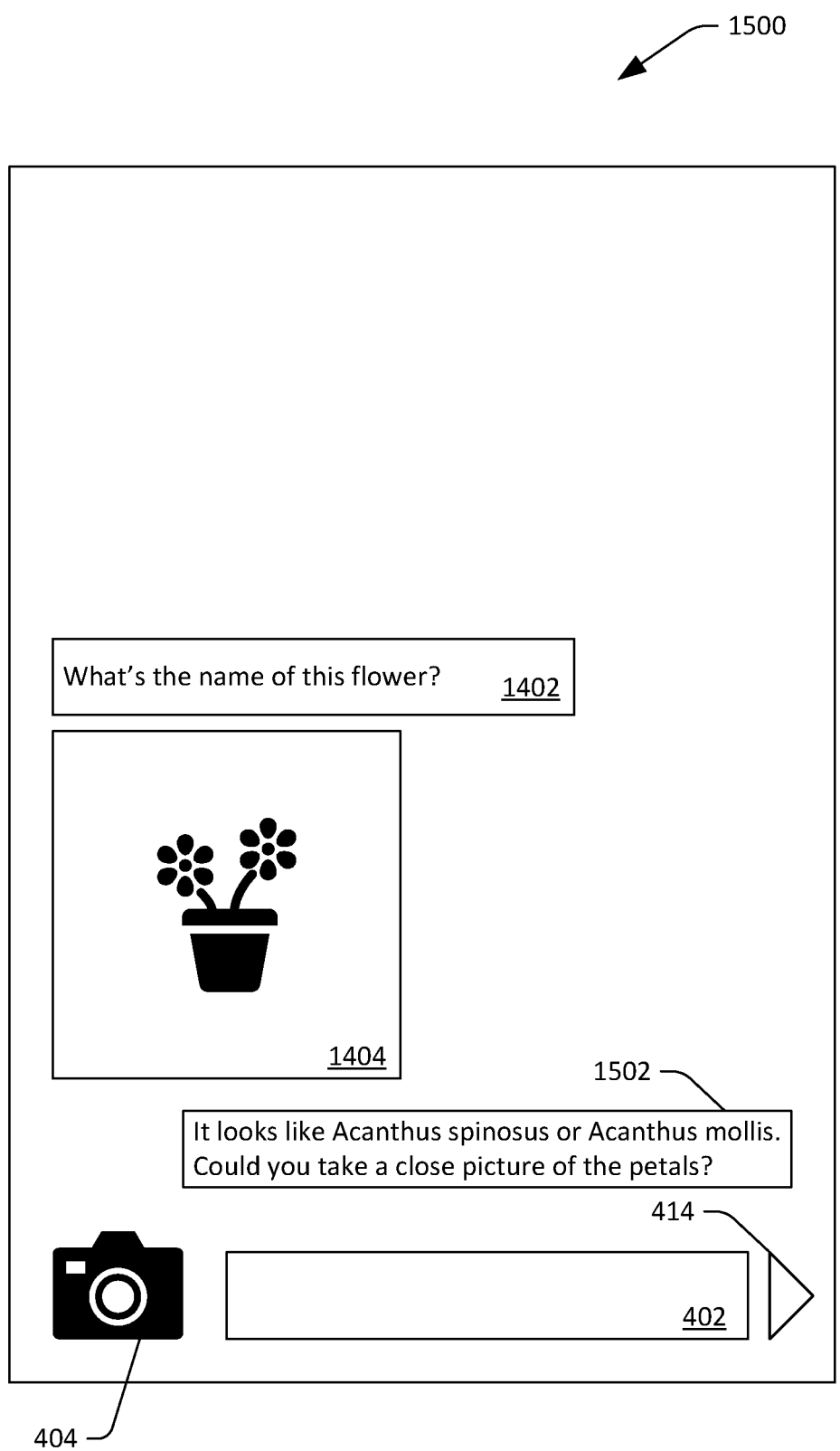

Now referring to FIG. 14, an exemplary GUI 1400 that facilitates interaction between the user of the client computing device 102 and the visual search engine 112 is illustrated. As shown in the exemplary GUI 1400, the user has set forth a multimodal query that includes text 1402 and an image 1404, wherein the text is "what's the name of this flower?" and the image 1404 includes a flower. The visual search engine 112 receives the text 1402 and the image 1404, and the visual intent module 114 ascertains that the user is interested in the topic "flowers". Upon determining that the user is interested in the topic "flowers", the visual intent module 114 causes the text 1402 and the image 1404 to be provided to a topic module that corresponds to the topic "flowers" in the topic modules 120-122. For example, the first topic module 120 may correspond to the topic "flowers". The first object identifier module 124 is provided with the image 1404, and in an example, can generate an output that indicates that the image 1404 captures one of two types of flower: *Acanthus spinosus* or *Acanthus mollis*. The first topic chat bot 126 receives the output of the first object identifier module 124 and, based upon the ambiguity as to whether the flower captured in the image 1404 is *Acanthus spinosus* or *Acanthus mollis*, can generate a message that requests information that will assist the first topic module 120 with disambiguating between the two types of flowers. FIG. 15 illustrates a GUI 1500 that includes a message 1502 generated by the first topic chat bot 126 and transmitted to the client computing device 102 for display in the GUI. The message 1502 requests that the user upload a relatively close picture of the petals of the flower to assist the first object identifier module 124 with disambiguating between the two types of flowers. In another example, the first topic chat bot 126 may generate a message that includes a request for a value of an attribute of the flower, wherein the first object identifier module 124 can disambiguate between the two types of flower when provided with the value of the attribute.

Figure 16:
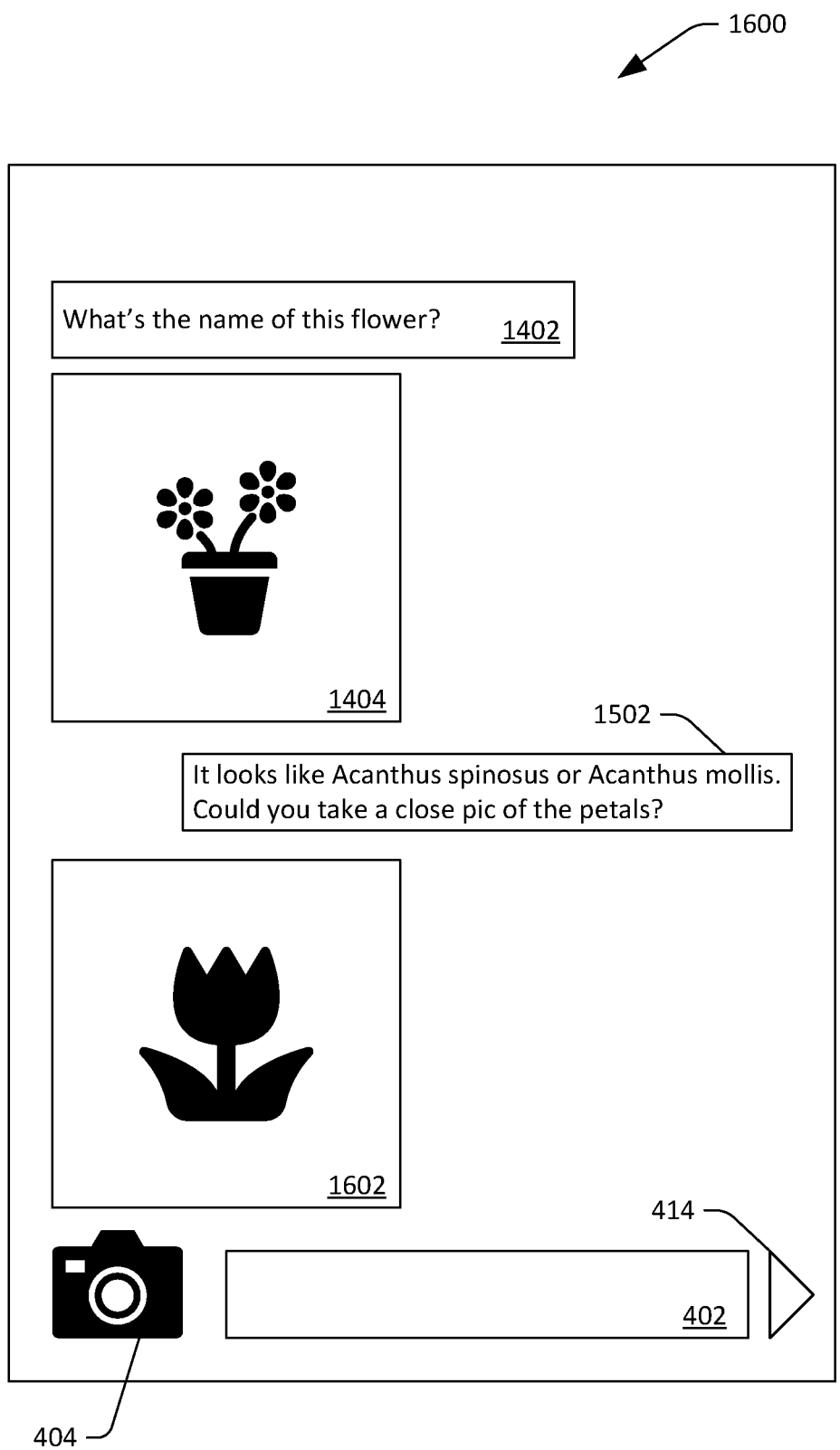
Figure 17:
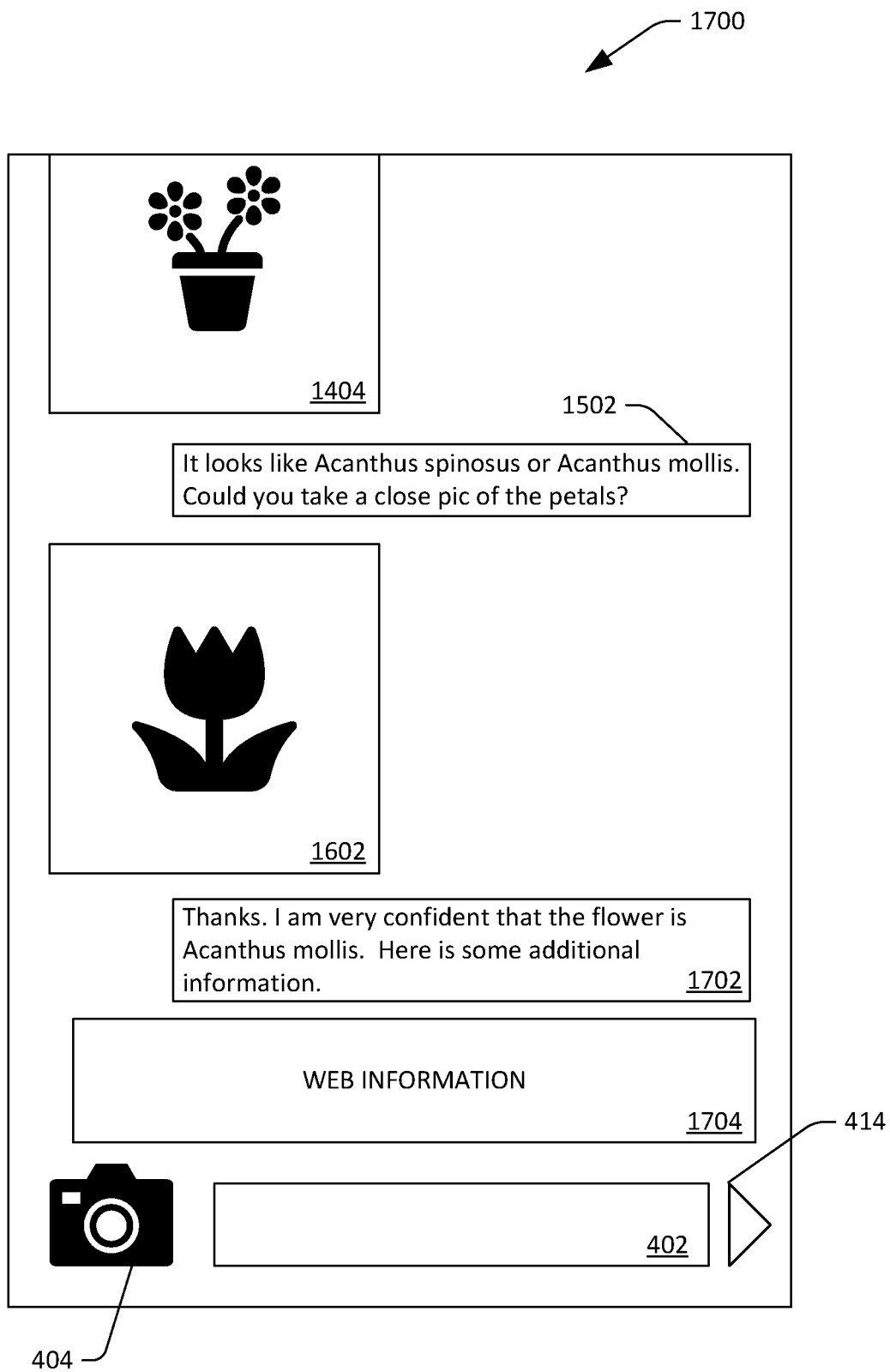

Referring now to FIG. 16, an exemplary GUI 1600 that illustrates an interaction between the user of the client computing device 102 and the visual search engine 112 is presented. In the exemplary GUI 1600, it can be ascertained that the user of the client computing device 102 has captured and uploaded an image in accordance with the instructions set forth by the first topic chat bot 126. The visual search engine 112 receives the image 1602, whereupon the image 1602 is provided to the first object identifier module 124. Upon receiving the image 1602, the first object identifier module 124 can determine with confidence that the flower is of a particular type (e.g. *Acanthus mollis*). With reference to FIG. 17, the first topic chat bot 126 can output a message 1702 to the client computing device 102, wherein the message 1702 identifies the name of the flower as being *Acanthus mollis*. In addition, the first topic chat bot 126 can transmit a query to the search engine 132, wherein the query can include the keywords "*Acanthus mollis*", The search engine 132 conducts a search based upon the query and can return information from the World Wide Web (from a webpage) to the first topic chat bot 126. The first topic chat bot 126 may then cause such information to be transmitted to the client computing device 102 for presentment thereon as web information 1704.

FIGS. 14-17 illustrate that the visual search engine 112 can interact with the user of the client computing device 102 in order to provide search results that meet the information retrieval intent of the user of the client computing device 102. For instance, based upon the text 1402, the visual search engine 112 can ascertain an information retrieval intent of the user of the client computing device 102 (e.g., the user is attempting to identify a name of a flower). In addition, because there is some uncertainty as to the name of the flower based upon the image 1404 provided to the visual search engine 112, the visual search engine 112 can request information from the user of the client computing device 102 to address such uncertainty. For example, the visual search engine 112 can request that the user provide a different image to the visual search engine 112. In contrast, if the image 1404 were provided to a conventional visual search engine, the conventional visual search engine may provide an incorrect identity of the flower or leave the user with some uncertainty as to the true identity of the flower.

Figure 18:
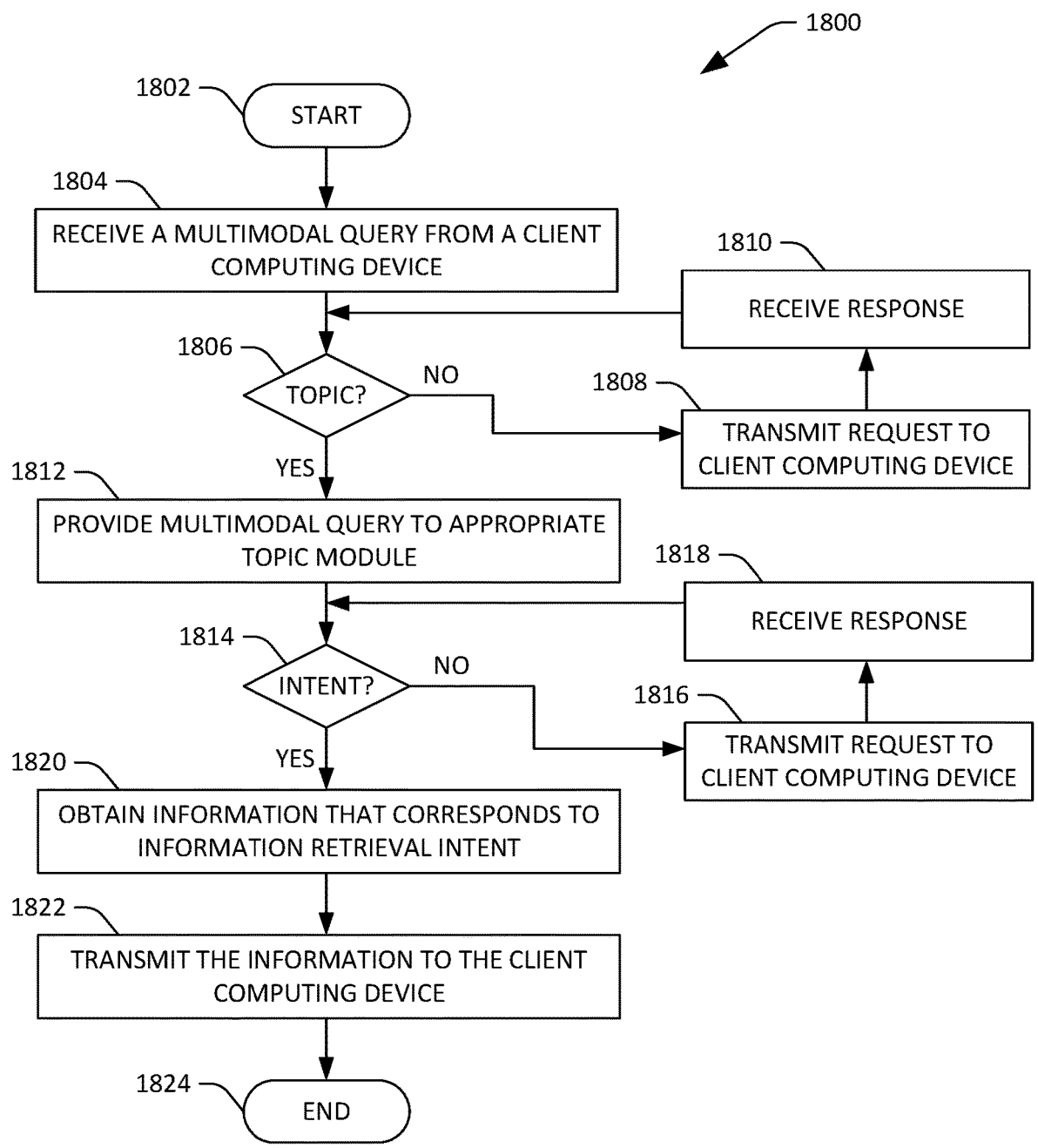
FIG. 18 is a flow diagram illustrating an exemplary methodology for performing a visual search.
Figure 19:
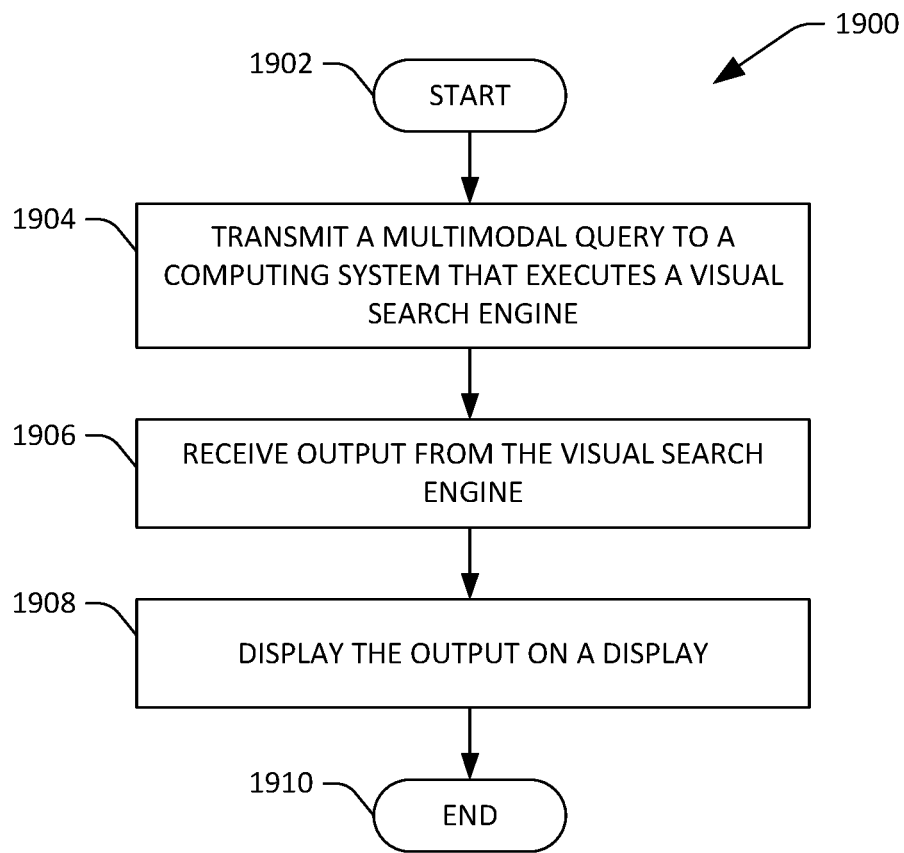
FIG. 19 is a flow diagram illustrating an exemplary methodology that facilitates interacting with a virtual search engine.

FIGS. 18 and 19 illustrate exemplary methodologies relating to visual search, wherein a visual search engine generates output based upon a query that comprises an image. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning solely to FIG. 18, a methodology 1800 performed by a visual search engine is illustrated. The methodology 1800 starts at 1802, and at 1804 a multimodal query is received from a client computing device, wherein the multimodal query comprises an image and text. As noted above, the multimodal query can be provided to the visual intent module 114 of the visual search engine 112. At 1806, a determination is made as to whether a topic of interest to the user can be identified based upon the multimodal query. In an example, the image in the multimodal query can include an object, and at 1806 a determination is made as to whether the visual search engine can determine that the object is assigned to a topic from amongst several predefined topics. When it is determined that a topic of interest cannot be identified, the methodology 1800 proceeds to 1808, where a request is transmitted to the client computing device for additional information. The requested additional information may be a second image, a value of an attribute of the object, etc. At 1810, a response to the request is received, wherein the response includes the requested additional information. The methodology 1800 then returns to 1806, where the determination is made as to whether the topic of interest to the user can be identified based upon the multimodal query and the additional information.

When it is determined at 1806 that the topic can be identified, the methodology 1800 proceeds to 1812, where the multimodal query (and potentially the additional information) is provided to an appropriate topic module from amongst a plurality of topic modules. The topic module that is provided the multimodal query is configured to assign one or more labels to objects that are assigned to the topic. For instance, when the topic module corresponds to the topic "flower", the topic module can be configured to assign a label that is indicative of a species and genus of a flower included in an image.

At 1814, a determination is made as to whether the topic module can ascertain an information retrieval intent of the user based upon the multimodal query (and potentially the additional information received at 1810). When the topic module is unable to assign the information retrieval intent of the user, the methodology 1800 proceeds to 1816, where a request for additional information (that can be used to disambiguate the information retrieval intent of the user) is transmitted to the client computing device. The requested additional information may be a request for another image, a request to identify an object from amongst several objects included in the image, etc. At 1818, a response to the request is received, and the methodology 1800 returns to 1814, where a determination is made as to whether the topic module can ascertain the information retrieval intent of the user based upon the multimodal query and the response received at 1818.

When the information retrieval intent is identified, the methodology 1800 proceeds to 1820, where information corresponding to the information retrieval intent of the user is obtained. For example, the information can be obtained from a general purpose search engine, as described above. At 1822, the information is transmitted to the client computing device for display thereon. The methodology 1800 completes at 1824.

Now referring to FIG. 19, an exemplary methodology 1900 performed by a client computing device in connection with a visual search is illustrated. The client computing device can be a mobile computing device that executes an application that interfaces with a visual search engine. For instance, such application may be a digital assistant application. The methodology 1900 starts at 1902, and at 1904 a multimodal query is transmitted to a computing system that executes a visual search engine. As described above, the visual search engine can receive the multimodal query and generate an output based upon the multimodal query. When an information retrieval intent of the user can be determined based upon the multimodal query, the output can be information that is relevant to the information retrieval intent (e.g., a search result). When the information retrieval intent of the user cannot be determined based upon the multimodal query, the output can be a message that requests additional information. At 1906, the output generated by the visual search engine is received from the computing system, and at 1908 the output is displayed on a GUI of the application (on a display of the client computing device) referenced above. The methodology 1900 completes at 1910.

Figure 20:
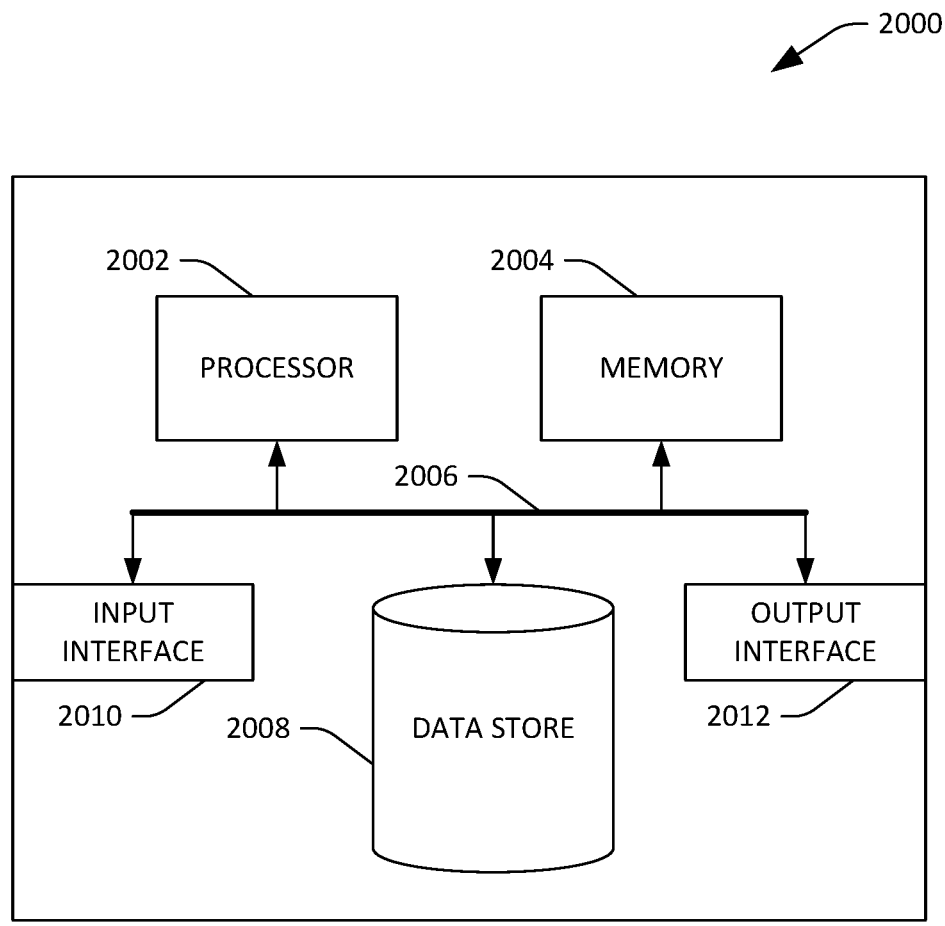
FIG. 20 is an exemplary computing system.

Referring now to FIG. 20, a high-level illustration of an exemplary computing device 2000 that can be used in accordance with the systems and methodologies disclosed herein is illustrated. For instance, the computing device 2000 may be used in a system that is configured to perform a visual search. By way of another example, the computing device 2000 can be used in a system that is configured to display output of a visual search engine. The computing device 2000 includes at least one processor 2002 that executes instructions that are stored in a memory 2004. The instructions may be, for instance, instructions for implementing functionality described as being carried out by one or more components discussed above or instructions for implementing one or more of the methods described above. The processor 2002 may access the memory 2004 by way of a system bus 2006. In addition to storing executable instructions, the memory 2004 may also store images, web information, etc.

The computing device 2000 additionally includes a data store 2008 that is accessible by the processor 2002 by way of the system bus 2006. The data store 2008 may include executable instructions, images, text, etc. The computing device 2000 also includes an input interface 2010 that allows external devices to communicate with the computing device 2000. For instance, the input interface 2010 may be used to receive instructions from an external computer device, from a user, etc. The computing device 2000 also includes an output interface 2012 that interfaces the computing device 2000 with one or more external devices. For example, the computing device 2000 may display text, images, etc. by way of the output interface 2012.

It is contemplated that the external devices that communicate with the computing device 2000 via the input interface 2010 and the output interface 2012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2000 may be a distributed system. Thus, for instance, several devices may be in communication by way of a network connection and may collectively perform tasks described as being performed by the computing device 2000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that executes a visual search engine, wherein the visual search engine is configured to generate output based upon images provided to the visual search engine, and further wherein the computing system is configured to perform acts comprising:
   receiving a multimodal query from a client computing device that is in communication with the computing system, wherein the multimodal query comprises:
      an image; and
      text that is separate from the image;
   based upon the multimodal query, returning first output to the client computing device, wherein the first output comprises first text generated by a first chatbot, the first chatbot is configured to disambiguate between topics that are assignable to multimodal queries;
   receiving feedback from the client computing device with respect to the first output;
   based upon the multimodal query and the feedback, assigning a topic to the multimodal query; and
   returning second output to the client computing device based upon the multimodal query, the feedback, and the identified topic, wherein the second output comprises second text generated by a second chatbot that has been developed to interact with users with respect to the identified topic.

2. The computing system of claim 1, wherein the multimodal query is received by way of a personal digital assistant executing on the client computing device.

3. The computing system of claim 1, wherein the first text comprises a message constructed by the first chat bot of the visual search engine, wherein the message includes a request for input from a user of the client computing device.

4. The computing system of claim 3, wherein the image includes an object, and further wherein the message includes a request for a second image that includes the object.

5. The computing system of claim 4, wherein the feedback includes the second image transmitted from the client computing device to the computing system wherein the visual search engine generates the second output based upon the text in the multimodal query and the second image, the acts further comprising:
   causing the second output of the visual search engine to be displayed in a graphical user interface (GUI) of an application that interfaces with the visual search engine.

6. The computing system of claim 5, wherein the second output comprises a third image.

7. The computing system of claim 5, the acts further comprising:
   assigning a label that identifies a type of the object in the second image;
   constructing a query that includes the label;
   transmitting the query to a web search engine; and
   receiving information extracted from a web page by the web search engine, wherein the second output comprises the information extracted from the web page.

8. A method performed by a computing system that is in network communication with a client computing device, the method comprising:

receiving, from the client computing device, a multimodal query, wherein the multimodal query comprises an image and text that is separate from the image;

based upon the multimodal query, returning first output to the client computing device, wherein the first output comprises first text generated by a first chatbot, the first chatbot is configured to disambiguate between topics that are assignable to multimodal queries;

receiving feedback from the client computing device with respect to the first output;

based upon the multimodal query and the feedback, assigning a topic to the multimodal query; and returning second output to the client computing device based upon the multimodal query, the feedback, and the identified topic, wherein the second output comprises second text generated by a second chatbot that has been developed to interact with users with respect to the identified topic.

9. The method of claim 8, wherein the feedback is a value of an attribute of an object included in the image.

10. The method of claim 8, wherein the feedback is a second image of an object that is included in the image.

11. The method of claim 8, wherein the query is received by way of a personal digital assistant executing on the client computing device.

12. The method of claim 8, wherein the second output comprises a video that is to be displayed in a graphical user interface (GUI) of an application that interfaces with a visual search engine being executed by the computing system.

13. A computing-readable storage medium of a computing system that is in network communication with a client computing device, wherein the computing system executes a visual search engine, wherein the visual search engine is configured to generate output based upon images provided to the visual search engine, and further wherein the computer-readable storage medium comprises instructions that, when executed by a processor, cause the processor to perform acts comprising:

receiving a multimodal query from a client computing device that is in communication with the computing system, wherein the multimodal query comprises:
an image; and
text that is separate from the image;

based upon the multimodal query, returning first output to the client computing device, wherein the first output comprises first text generated by a first chatbot, the first chatbot is configured to disambiguate between topics that are assignable to multimodal queries;

receiving feedback from the client computing device with respect to the first output;

based upon the multimodal query and the feedback, assigning a topic to the multimodal query; and returning second output to the client computing device based upon the multimodal query, the feedback, and the identified topic, wherein the second output comprises second text generated by a second chatbot that has been developed to interact with users with respect to the identified topic.

14. The computer-readable storage medium of claim 13, wherein the multimodal query is received by way of a personal digital assistant executing on the client computing device.

15. The computer-readable storage medium of claim 13, wherein the first text comprises a message constructed by the first chat bot of the visual search engine, wherein the message includes a request for input from a user of the client computing device.

16. The computer-readable storage medium of claim 15, wherein the image includes an object, and further wherein the message includes a request for a second image that includes the object.

17. The computer-readable storage medium of claim 16, wherein the feedback includes the second image transmitted from the client computing device to the computing system wherein the visual search engine generates the second output based upon the text in the multimodal query and the second image, the acts further comprising:

causing the second output of the visual search engine to be displayed in a graphical user interface (GUI) of an application that interfaces with the visual search engine.

18. The computer-readable storage medium of claim 17, wherein the second output comprises a third image.

19. The computer-readable storage medium of claim 17, the acts further comprising:

assigning a label that identifies a type of the object in the second image;
constructing a query that includes the label;
transmitting the query to a web search engine; and
receiving information extracted from a web page by the web search engine, wherein the second output comprises the information extracted from the web page.

20. The method of claim 8, wherein the first text comprises a message constructed by the first chat bot of the visual search engine, wherein the message includes a request for input from a user of the client computing device, wherein the image includes an object, and further wherein the message includes a request for a second image that includes the object.

* * * * *